US012567664B2

(12) United States Patent
An et al.

(10) Patent No.: US 12,567,664 B2
(45) Date of Patent: Mar. 3, 2026

(54) ELECTRONIC DEVICE INCLUDING SLIDING STRUCTURE, FLEXIBLE DISPLAY, AND ANTENNA

(71) Applicant: SAMSUNG ELECTRONICS CO., LTD., Suwon-si (KR)

(72) Inventors: Seongyong An, Suwon-si (KR); Jiho Kim, Suwon-si (KR); Kyihyun Jang, Suwon-si (KR); Yoonjae Lee, Suwon-si (KR); Jaebong Chun, Suwon-si (KR); Sangmin Han, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 333 days.

(21) Appl. No.: 18/205,482

(22) Filed: Jun. 2, 2023

(65) Prior Publication Data

US 2023/0318168 A1 Oct. 5, 2023

Related U.S. Application Data

(63) Continuation of application No. PCT/KR2021/018268, filed on Dec. 3, 2021.

(30) Foreign Application Priority Data

| | | |
|---|---|---|
| Dec. 4, 2020 | (KR) | 10-2020-0168918 |
| Feb. 3, 2021 | (KR) | 10-2021-0015506 |

(51) Int. Cl.
| | |
|---|---|
| *H04W 48/18* | (2009.01) |
| *H01Q 1/24* | (2006.01) |
| (Continued) | |

(52) U.S. Cl.
CPC ........... *H01Q 1/243* (2013.01); *H04B 1/0053* (2013.01); *H04M 1/0268* (2013.01); *H04M 1/0274* (2013.01)

(58) Field of Classification Search
CPC ........ H01Q 1/243; H01Q 5/307; H01Q 21/28; H04B 1/0053; H04M 1/0268;
(Continued)

(56) References Cited

U.S. PATENT DOCUMENTS

| | | |
|---|---|---|
| 8,081,120 B2 | 12/2011 | Yoshioka |
| 8,665,160 B2 | 3/2014 | Uttermann et al. |
| | (Continued) | |

FOREIGN PATENT DOCUMENTS

| | | |
|---|---|---|
| JP | 2018186488 A | 11/2018 |
| JP | 6516022 B2 | 5/2019 |
| | (Continued) | |

OTHER PUBLICATIONS

Extended European Search Report Issued In EP Application No. 21901085.7-1224, Mail Date Mar. 28, 2024, 7 Pages.
(Continued)

*Primary Examiner* — Tanmay K Shah
(74) *Attorney, Agent, or Firm* — CANTOR COLBURN LLP

(57) ABSTRACT

An electronic device including a housing including a first housing and a second housing that can slide with respect to the first housing, a flexible display arranged to be supported by the housing, the flexible display including a first area exposed to the outside of the electronic device and a second area, which extends from the first area and is withdrawn from the housing and is drawn into the housing according to the sliding of the second housing, a cavity structure positioned in the second housing and a wireless communication circuit configured to transmit and/or receive a signal of a selected or designated frequency band through the cavity structure.

17 Claims, 35 Drawing Sheets

(51) Int. Cl.
    *H04B 1/00*      (2006.01)
    *H04M 1/02*     (2006.01)

(58) Field of Classification Search
    CPC .. H04M 1/0274; G06F 1/1624; G06F 1/1637;
                             G06F 1/1652; G06F 1/1698
    USPC ...................................................... 455/552.1
    See application file for complete search history.

(56)             References Cited

U.S. PATENT DOCUMENTS

| | | | |
|---|---|---|---|
| 9,083,087 | B2 | 7/2015 | Shan et al. |
| 9,831,928 | B2 | 11/2017 | Kim et al. |
| 10,135,117 | B2 | 11/2018 | Slater et al. |
| 11,252,826 | B2 | 2/2022 | Park et al. |
| 11,432,418 | B2 | 8/2022 | Yoon et al. |
| 2008/0024893 | A1 | 1/2008 | Vanjani et al. |
| 2019/0165478 | A1 | 5/2019 | Jo et al. |
| 2020/0303809 | A1 | 9/2020 | Jung et al. |
| 2021/0135492 | A1 | 5/2021 | Kim et al. |
| 2021/0219437 | A1 | 7/2021 | Kim et al. |
| 2021/0344783 | A1 | 11/2021 | Jeong et al. |

FOREIGN PATENT DOCUMENTS

| | | | | | |
|---|---|---|---|---|---|
| KR | 20090031969 | A | | 3/2009 | |
| KR | 101284269 | B1 | | 7/2013 | |
| KR | 20190061936 | A | * | 6/2019 | ............. H01Q 9/285 |
| KR | 20190101184 | A | | 8/2019 | |
| KR | 20190115888 | A | | 10/2019 | |
| KR | 20190143029 | A | * | 12/2019 | .......... H04M 1/0249 |
| KR | 20200024500 | A | | 3/2020 | |
| KR | 20200092586 | A | | 8/2020 | |

OTHER PUBLICATIONS

International Search Report and Written Opinion for International Application No. PCT/KR2021/018268; International Filing Date Dec. 3, 2021; Date of Mailing Mar. 3, 2022 (9 pages).
Korean Office Action Issued In KR Application No. 10-2021-0015506; Mail Date Jun. 18, 2025; 11 Pages.

* cited by examiner

FIG. 4

ELECTRONIC DEVICE INCLUDING SLIDING STRUCTURE, FLEXIBLE DISPLAY, AND ANTENNA

CROSS-REFERENCE TO RELATED APPLICATIONS

This application is a continuation application, claiming priority under § 365(c), of International Application No. PCT/KR2021/018268, filed on Dec. 3, 2021, which is based on and claims the benefit of Korean patent application number 10-2021-0015506 filed on Feb. 3, 2021, in the Korean Intellectual Property Office and of Korean patent application number 10-2020-0168918, filed on Dec. 4, 2020, in the Korean Intellectual Property Office, the disclosures of which are incorporated by reference herein in their entireties.

BACKGROUND

(1) Field

The disclosure relates to an electronic device including a sliding structure, a flexible display, and an antenna.

(2) Description of the Related Art

An electronic device may include an exterior metal member, and such an exterior metal member is able to improve durability as well as provide a unique luxurious design of metal. As various applications become available, the number of antennas included in an electronic device such as a smartphone is continuously increasing. An electronic device may utilize an exterior metal member as an antenna.

SUMMARY

With the development of digital technology, electronic devices are provided in various forms such as smartphones, tablet personal computers (PCs), or personal digital assistants (PDAs). Electronic devices may be being designed to provide a larger screen while having a portable size which does not cause inconvenience to a user when held by hand. For example, an embodiment of an electronic device may be implemented to expand the screen in a sliding manner. An electronic device may include a flexible display where a part of the flexible display may be withdrawn from an inner space of the electronic device, and accordingly, the screen may be expandable. However, due to the structure for the sliding operation, it may be difficult to place or add an antenna while securing antenna radiation performance.

Embodiments of the disclosure address at least the above-mentioned issues and provide at least the advantages described below. Accordingly, embodiments of the disclosure is to provide an electronic device including a sliding structure, a flexible display, and an antenna.

Additional embodiments will be set forth in part in the description which follows and, in part, will be apparent from the description, or may be learned by practice of the presented embodiments.

In accordance with an embodiment of the disclosure, an electronic device is provided. The electronic device may include a housing including a first housing and a second housing which may be slidable with respect to the first housing, a flexible display arranged to be supported by the housing, the flexible display including a first area exposed to the outside of the electronic device and a second area which extends from the first area and may be drawn out of the housing and/or may be drawn into the housing according to the sliding of the second housing, a cavity structure located in the second housing, and a wireless communication circuit transmitting and/or receiving a signal of a selected or designated frequency band via the cavity structure.

According to various embodiments of the disclosure, in an electronic device including a flexible display, an antenna capable of securing antenna radiation performance while overcoming limitations of antenna design due to a sliding structure may be provided.

Other embodiments, advantages, and features of the disclosure will become apparent to those skilled in the art from the following detailed description, which, taken in conjunction with the annexed drawings, discloses various the embodiments of the disclosure.

BRIEF DESCRIPTION OF THE DRAWINGS

The above and other aspects, features, and advantages of embodiments of the disclosure will be more apparent from the following description taken in conjunction with the accompanying drawings, in which:

FIG. 4 illustrates a cross-sectional structure of an electronic device taken along line A-A' in FIG. 2A according to an embodiment;

DETAILED DESCRIPTION

Figure 1:
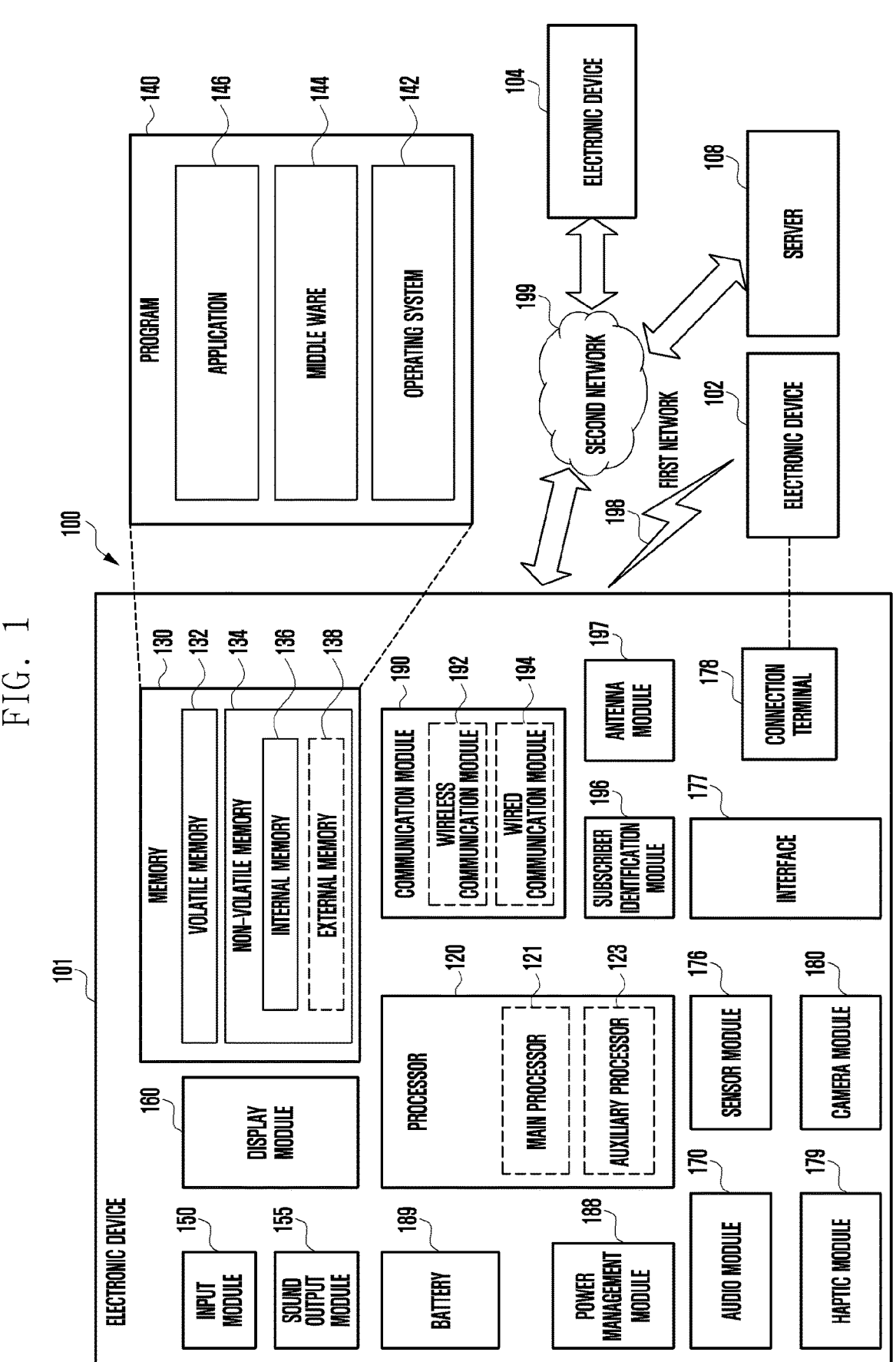
FIG. 1 is a block diagram of an electronic device in a network environment according to an embodiment.

Hereinafter, various embodiments of the disclosure are described with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). The electronic device 101 may communicate with the electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a mic, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the electronic device 102) directly (e.g., hardwired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., hardwired) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLU-ETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 50 network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mm Wave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mm Wave antenna module. According to an embodiment of the disclosure, the mm Wave antenna module may include a PCB, an RFIC that is disposed on or adjacent to a first surface (e.g., the bottom surface) of the PCB and is capable of supporting a predetermined high-frequency band (e.g., a mm Wave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), it means that the element may be coupled with the other element directly (e.g., hardwired), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments of the disclosure as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
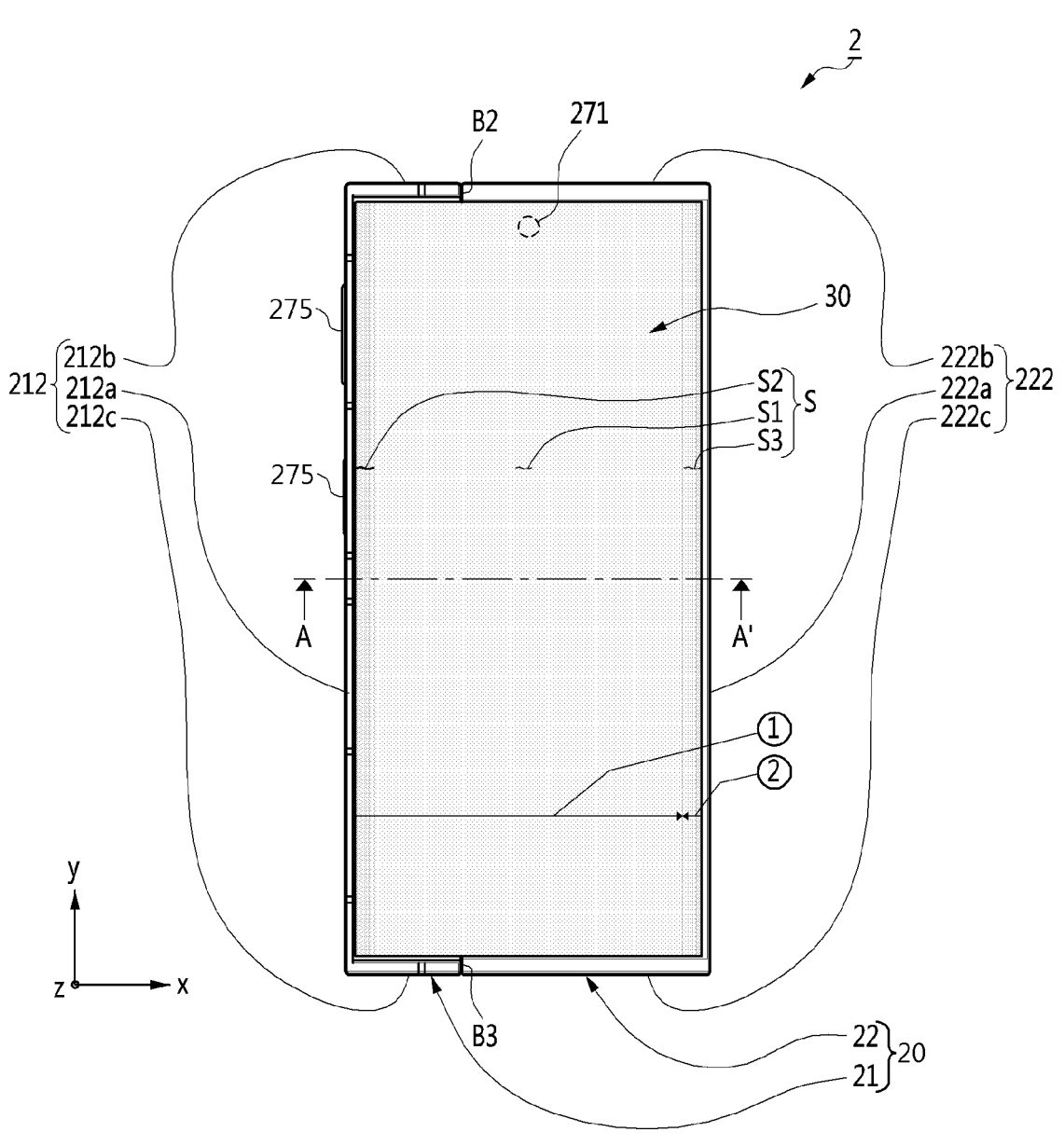
FIG. 2A is a front view of an electronic device in a closed state according to an embodiment.
Figure 2B:
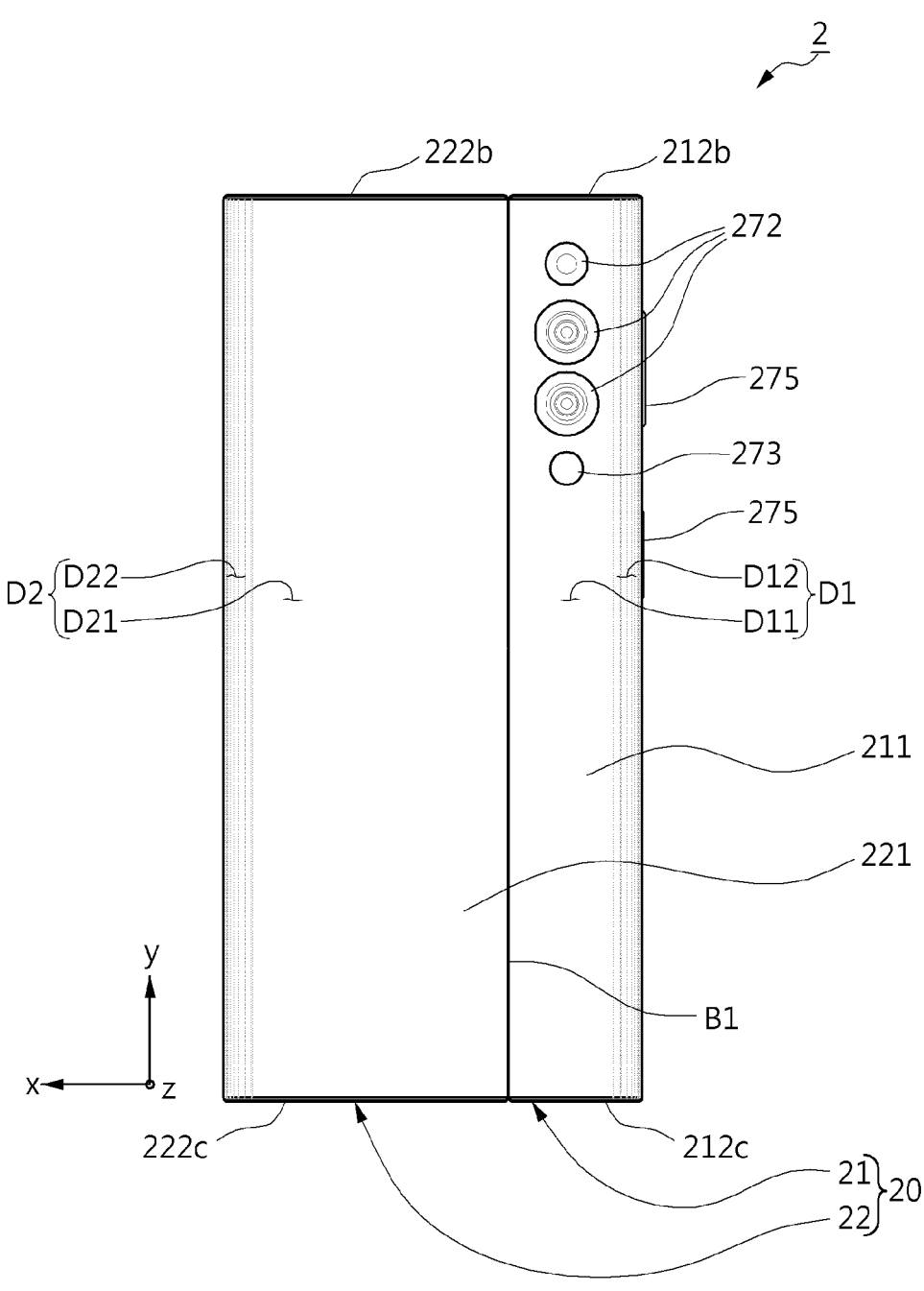
FIG. 2B is a rear view of an electronic device in a closed state according to an embodiment.
Figure 3A:
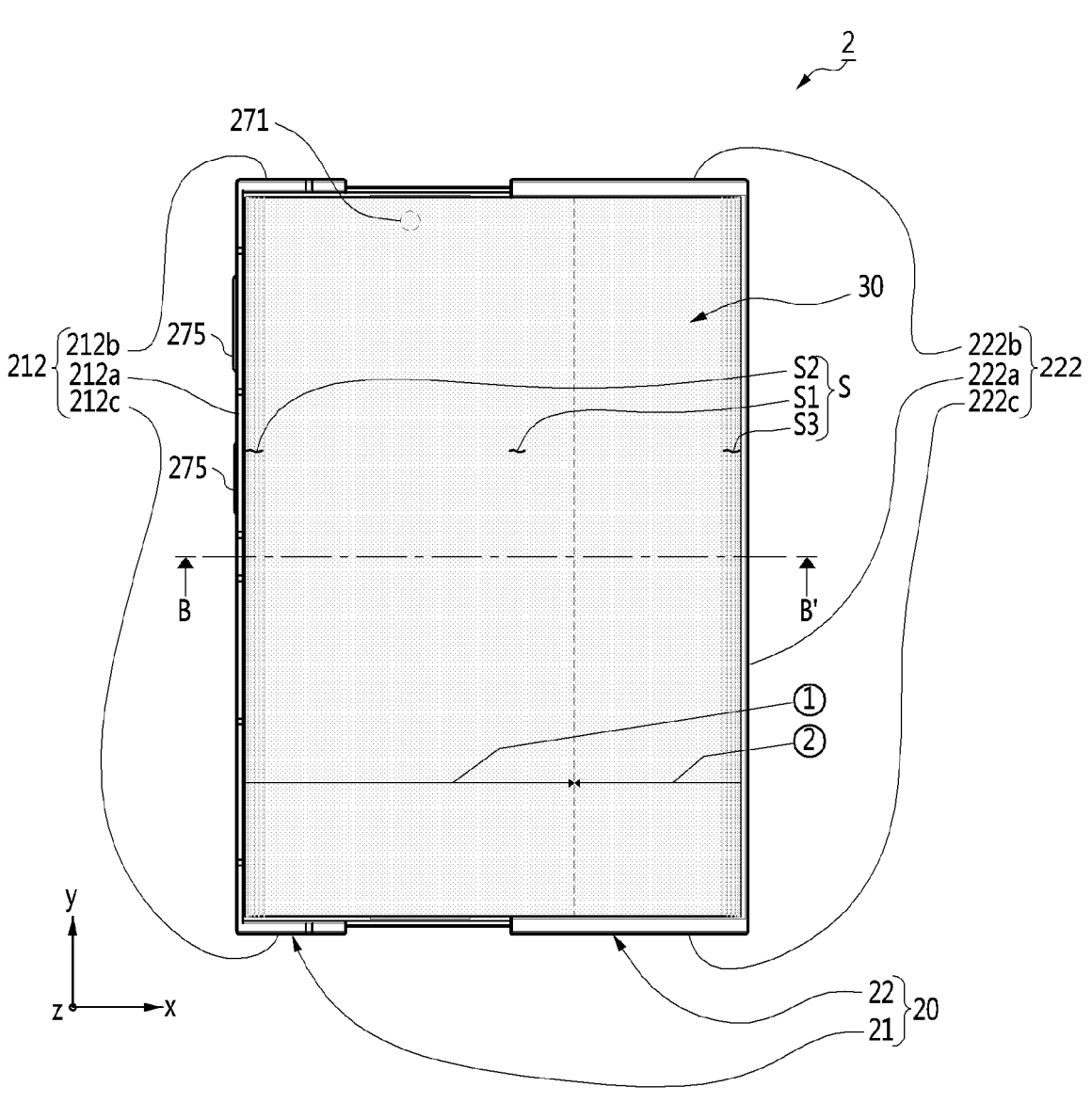
FIG. 3A is a front view of an electronic device in an open state according to an embodiment.
Figure 3B:
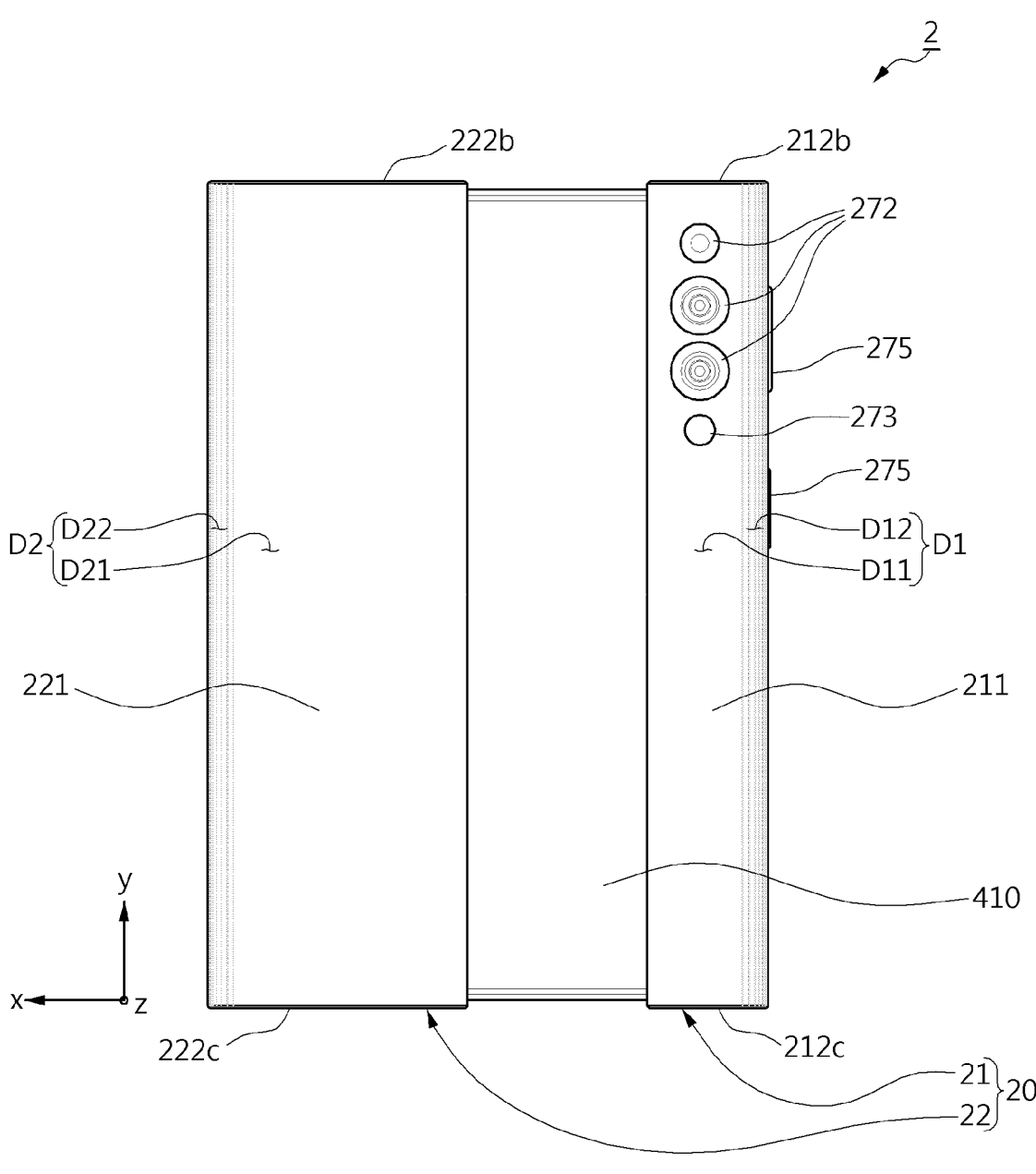
FIG. 3B is a rear view of an electronic device in an open state according to an embodiment.

FIG. 2A is a front view of an electronic device 2 in a closed state according to an embodiment. FIG. 2B is a rear view of an electronic device 2 in a closed state according to an embodiment. FIG. 3A is a front view of an electronic device 2 in an open state according to an embodiment. FIG. 3B is a rear view of an electronic device 2 in an open state according to an embodiment. In various embodiments, for convenience of explanation, a direction in which the screen S is visually exposed (e.g., the +z-axis direction) is interpreted as the front of the electronic device 2, and the opposite direction (e.g., the −z-axis direction) is interpreted as the rear of the electronic device 2.

Referring to FIGS. 2A, 2B, 3A, and 3B, an embodiment of the electronic device 2 may include a housing (or a housing structure) 20 and a flexible display 30. The housing 20 may include, for example, a first housing (or, a first housing portion or a first housing structure) 21 and a second housing (or, a second housing portion or a second housing structure) 22. The second housing 22 may be slidable with respect to the first housing 21 in a designated direction (e.g., the +x-axis direction). A sliding structure for the sliding of the second housing 22 may be included between the first housing 21 and the second housing 22. The sliding structure may include, for example, a guide rail and a slide or a roller guided on a guide rail to be moved. The sliding structure may be implemented in various other manners. The flexible display 30 may form a screen (or a display region) S viewable to the outside of the electronic device 2. The flexible display 30 may include a first area ① exposed to the outside of the electronic device 2 and a second area ② which extends from the first area ① and may be drawn out of the housing 20 and/or into the housing 20 according to the sliding of the second housing 22. In an embodiment, for example, at least a part of the second area ② may be drawn out of the electronic device 2 and/or into the electronic device 2 according to the sliding of the second housing 22, and accordingly, the size of the screen S may vary. The second area ②, which may be a bent part of the flexible display 30 in the state change of the electronic device 2 (e.g., transition between a closed state and an open state), may be referred to as another term such as a bendable area and/or a bendable section. FIG. 2A shows the electronic device 2 in a state where the screen S is not expanded, and FIG. 3A shows the electronic device 2 in a state where the screen S is expanded. The state where the screen S is not expanded, which is a state where the second housing 22 has not been moved in a first direction (e.g., the +x-axis direction) with respect to the first housing 21, may be referred to as a closed state of the electronic device 2. The state where the screen S is expanded, which is a state where the second housing 22 has been moved to the maximum so that the second housing 22 may not be moved any farther in the first direction, may be referred to as an open state of the electronic device 2. In an embodiment, the open state may include a completely open state (see FIG. 3A) or an intermediate state (intermediated state). The intermediate state may refer to a state between a closed state (see FIG. 2A) and a completely open state. In an embodiment, when the second housing 22 is at least partially moved in the first direction with respect to the first housing 21, the state may be referred to as a "slide-out" of the second housing 22. In an embodiment, when the second housing 22 is at least partially moved in a second direction (e.g., the −x-axis direction) opposite to the first direction with respect to the first housing 21, the state may be referred to as a "slide-in" of the second housing 22. Hereinafter, the first direction may be referred to as a "direction of a slide-out", and the second direction may be referred to as a "direction of a slide-in". In the electronic device 2 having an expandable screen S that corresponds to the slide-out of the second housing 22, the flexible display 30 may be referred to as another term such as an "expandable display" or a "slide-out display".

According to an embodiment, the screen S may include a first flat surface portion S1, a first curved surface portion S2, and/or a second curved surface portion S3. The first flat surface portion S1 may be located between the first curved surface portion S2 and the second curved surface portion S3. The first curved surface portion S2 and the second curved surface portion S3 may have a shape bent from the first flat surface portion S1 toward the rear surface (e.g., a surface located at a side opposite to the screen S) of the electronic device 2. The first curved surface portion S2 and the second curved surface portion S3 may be substantially symmetrical while having the first flat surface portion S1 interposed therebetween. The first flat surface portion S1 may be expanded or contracted according to a state change of the electronic device 2 (e.g., switching between a closed state and an open state). The second curved surface portion S3 may be provided in substantially the same shape even when the state of the electronic device 2 changes. A portion forming the second curved surface portion S3 of the second area ② of the flexible display 30 may change according to a state change of the electronic device 2. The first curved surface portion S2 may be located on the opposite side of the second curved surface portion S3 in a closed state or an open state of the electronic device 2 to improve aesthetics of the screen S. According to an embodiment, the first flat surface portion S1 may be implemented in an expanded form without the first curved surface portion S2 and/or the second curved surface portion S3.

According to an embodiment, the first housing 21 may include a first back cover 211 and a first side cover 212. The first back cover 211 may be located at an opposite side of the screen S. When viewed from the top of the screen S (e.g., when viewed in the −z-axis direction), the first back cover 211 may overlap a partial area of the screen S. The first side cover 212 may surround a part of a space between the first back cover 211 and the screen S, and form a lateral surface portion of the electronic device 2. The first side cover 212 may include, for example, a first cover portion 212a, a second cover portion 212b, and/or a third cover portion 212c. The first cover portion 212a may be located on the first curved surface portion S2 side of the screen S. The second cover portion 212b may extend from one end of the first cover portion 212a in a slide-out direction (e.g., the +x-axis direction). The third cover portion 212c may extend from the other end of the first cover portion 212a in the slide-out direction. According to an embodiment, the first cover portion 212a, the second cover portion 212b, and the third cover portion 212c may be integrally formed and/or may include the same material (e.g., metal (e.g., aluminum, stainless steel (STS), or magnesium), or polymer). In an embodiment, the first side cover 212 may be disposed at and/or coupled to the second cover portion 212b and/or the third cover portion 212c to further include a separate cover member forming an outer surface of the electronic device 2.

According to an embodiment, the second housing 22 may include a second back cover 221 and a second side cover 222. The second back cover 221 may be located at the opposite side of the screen S. When viewed from the top of the screen S, the second back cover 221 may overlap a partial area of the screen S. The second side cover 222 may surround a part of a space between the second back cover 221 and the screen S, and form the lateral surface portion of the electronic device 2. The second side cover 222 may include, for example, a first cover portion 222a located at the second curved surface portion S3 side of the screen S, a second cover portion 222b extending from one end of the first cover portion 222a in a slide-in direction (e.g., the −x-axis direction), and/or a third cover portion 222c extending from the other end of the first cover portion 222a in the slide-in direction. According to an embodiment, the first cover portion 222a, the second cover portion 222b, and/or the third cover portion 222c of the second side cover 222 may be integrally formed, and/or may include the same material (e.g., metal (e.g., aluminum, stainless steel (STS), or magnesium), or polymer). In an embodiment, the second side cover 222 may be disposed at and/or coupled to the second cover portion 222b and/or the third cover portion 222c to further include a separate cover member forming an outer surface of the electronic device 2. The first cover portion 212a of the first side cover 212 and/or the first cover portion 222a of the second side cover 222 may extend in a third direction (e.g., the y-axis direction) orthogonal to the slide-out direction (or the slide-in direction) to be substantially parallel to each other. The second cover portion 212b of the first side cover 212 and/or the second cover portion 222b of the second side cover 222 may be located toward one edge side of the screen S. The third cover portion 212c of the first side cover 212 and/or the third cover portion 222c of the second side cover 222 may be located toward the other edge side of the screen S. The housing 20 may include a first boundary portion B1 where the first back cover 211 and the second back cover 221 face each other. The housing 20 may include a second boundary portion B2 where the second cover portion 212b of the first side cover 212 and the second cover portion 222b of the second side cover 222 face each other. The housing 20 may include a third boundary portion B3 where the third cover portion 212c of the first side cover 212 and the third cover portion 222c of the second side cover 222 face each other. The first boundary portion B1 may extend from the second boundary portion B2 to the third boundary portion B3. When viewed from the top of the screen S (e.g., in the −z-axis direction), the second boundary portion B2 and the third boundary portion B3 may be aligned in a third direction (e.g., in the y-axis direction). The first boundary portion B1, the second boundary portion B2, and/or the third boundary portion B3 may correspond to portions of the exterior of the electronic device 2 where the first housing 21 and the second housing 22 substantially come into contact with each other when the electronic device 2 is switched from the open state to the closed state. According to an embodiment, an insulating member may be disposed on the first boundary portion B1, the second boundary portion B2, and/or the third boundary portion B3. For example, an insulating member may be disposed in at least a part between the first housing 21 and the second housing 22 to electrically separate the housings.

According to an embodiment, the electronic device 2 may include a first support structure 410 coupled to the first housing 21 and/or have at least a part that may be integrally formed with the first housing 21. At least a part of the first area (1) of the flexible display 30 may be disposed on the first support structure 410. The electronic device 2 may include a second support structure (not shown) located on the second housing 22 to correspond to at least a part of the second area (2) of the flexible display 30. In the slide-out, due to the spatial positional relationship between the first support structure 410 coupled to the first area (1) and/or the second support structure corresponding to at least a part of the second area (2), at least a part of the second area(2) may be withdrawn to the outside through a space between the first cover portion 222a and the second support structure. In the slide-in, due to the spatial positional relationship between the first support structure 410 coupled to the first area (1) and/or the second support structure corresponding to at least a part of the second area (2), at least a part of the second area (2), may be drawn into the housing 20 through the space between the first cover portion 222a and the second support structure. One surface coupled to the first area (1) of the flexible display 30 in the first support structure 410 may include, for example, a flat surface area and a curved surface area. The flat surface area of the first support structure 410 may contribute to forming the first flat surface portion S1 of the screen S. The curved surface area of the first support structure 410 may contribute to forming the first curved surface portion S2 of the screen S. The second curved surface portion S3 of the screen S may be formed to correspond to a curved portion of the second support structure. In an embodiment, the first curved surface portion S2 and/or the second curved surface portion S3 may be omitted.

According to an embodiment, the first back cover 211 may form a first rear surface D1 of the electronic device 2, and/or the second back cover 221 may form a second rear surface D2 of the electronic device 2. The first rear surface D1 may include, for example, a second flat surface portion D11 parallel to the first flat surface portion S1 of the screen S and/or a third curved surface portion D12 bent from the second flat surface portion D11 toward the first curved surface portion S2 to correspond to the first curved surface portion S2 of the screen S. The second rear surface D2 may include, for example, a third flat surface portion D21 substantially parallel to the first flat surface portion S1 of the screen S and/or a fourth curved surface portion D22 curved from the third flat surface portion D21 toward the second curved surface portion S3 to correspond to the second curved surface portion S3 of the screen S. In an embodiment, in the closed state of the electronic device 2, the second flat surface portion D11 and/or the third flat surface portion D21 may be smoothly connected without a height difference. In an embodiment, the third flat surface portion D21 may be implemented in an expanded form without the third curved surface portion D12 and/or the fourth curved surface portion D22. In an embodiment, the first back cover 211 and/or the second back cover 221 may be omitted.

According to an embodiment, the first back cover 211 and/or the second back cover 221 may be opaque. The first back cover 211 and/or the second back cover 221 may be formed by, for example, coated or tinted glass, ceramic, polymer, metal (e.g., aluminum, stainless steel (STS), or magnesium), and/or a combination of at least two of the above materials.

According to an embodiment, in a state where the second area (2) of the flexible display 30 is at least partially drawn into the inner space of the housing 20 (e.g., the closed state of the electronic device 2), at least a part of the second area (2) may be viewed from the outside via the second rear surface D2. At least a part of the second back cover 221 may be transparent or translucent. In an embodiment, in the closed state of the electronic device 2, when a member located between the second back cover 221 and/or at least a part of the second area ② exists, at least a part of the member may include an opening and/or may be formed to be transparent or translucent.

According to an embodiment, a sliding structure related to the second housing 22 may include an elastic structure. For example, if the second housing 22 is moved to a configured distance by an external force, due to the elastic structure included in the sliding structure, the electronic device may be switched from the closed state to the open state and/or from the open state to the closed state without any more external force (e.g., a semi-automatic slide operation). According to an embodiment, if a signal is produced by an input device included in the electronic device 2, the electronic device 2 may be switched from the closed state to the open state and/or from the open state to the closed state due to a driving device such as a motor connected to the second housing 22. For example, if a signal is produced via a hardware button and/or a software button provided via the screen S, the electronic device 2 may be switched from the closed state to the open state and/or from the open state to the closed state. According to an embodiment, if signals are produced from various sensors such as a pressure sensor, the electronic device 2 may be switched from the closed state to the open state and/or from the open state to the closed state.

According to an embodiment, the electronic device 2 may include a first camera module 271, a plurality of second camera modules 272, and/or a flash 273. The first camera module 271 and/or the plurality of second camera modules 272 may include one or more lenses, an image sensor, and/or an image signal processor. The flash 273 may include, for example, a light emitting diode and/or a xenon lamp.

The first camera module 271 (e.g., the camera module 180 of FIG. 1) may be aligned, for example, with an opening (e.g., a through hole or a notch) formed through the screen S to be located inside the electronic device 2. External light may be introduced into the first camera module 271 by being transmitted through the opening and/or a partial area of a transparent cover overlapping the opening. The transparent cover may serve to protect the flexible display 30 from the outside, and/or may be implemented, for example, with a flexible member such as a plastic film (e.g., polyimide film) or ultra-thin glass (UTG).

In an embodiment, the first camera module 271 may be disposed at a lower end of at least a part of the screen S, and/or may perform a related function (e.g., image photographing) while the position of the first camera module 271 is not visually distinguished (or exposed). For example, the first camera module 271 may be located at a rear surface of the screen S and/or below or beneath the screen S. The first camera module 271 may be located to be aligned with a recess formed on the rear surface of the flexible display 30, for example. When viewed from the top of the screen S (e.g., when viewed in the −z-axis direction), the first camera module 271 may be disposed to overlap at least a part of the screen S to acquire an image of an external subject without being exposed to the outside. A partial area of the flexible display 30 at least partially overlapping the first camera module 271 may include a different pixel structure and/or wiring structure compared to other areas. For example, a partial area of the flexible display 30 at least partially overlapping the first camera module 271 may have a different pixel density compared to other areas. The pixel structure and/or wiring structure formed in a partial area of the flexible display 30 at least partially overlapping the first camera module 271 may reduce loss of light between the outside and the first camera module. According to an embodiment, a pixel may not be disposed in the partial area of the flexible display 30 at least partially overlapping the first camera module 271.

According to various embodiments, the plurality of second camera modules 272 (e.g., the camera module 180 of FIG. 1) and/or the flash 273 may be located, for example, in the first housing 21 to correspond to the first rear surface D1 of the electronic device 2. The plurality of second camera modules 272 may have properties (e.g., angle of view) or functions different from each other, and may include, for example, a dual camera or a triple camera. In an embodiment, the plurality of second camera modules 272 may include lenses having angles of view different from each other, and/or the electronic device 2 may control the camera module performed in the electronic device 2 to be changed based on a user's selection. As another example, the plurality of second camera modules 272 may include at least one among a wide-angle camera, a telephoto camera, a color camera, a monochrome camera, and/or an infrared (IR) camera (e.g., a time of flight (TOF) camera or a structured light camera). An IR camera may operate, for example, as at least a part of a sensor module (not shown) (e.g., the sensor module 176 of FIG. 1). In an embodiment, one camera module may replace the plurality of second camera modules 272.

According to various embodiments (not shown), the electronic device 2 may include various sensor modules (e.g., the sensor module 176 of FIG. 1). The sensor module may produce an electrical signal and/or a data value corresponding to an internal operation state of the electronic device 2 and/or an external network environment state. The sensor module may include, for example, at least one among a proximity sensor, a gesture sensor, a gyro sensor, a barometric pressure sensor, a magnetic sensor, an acceleration sensor, a grip sensor, a color sensor, an infrared (IR) sensor, a biometric sensor (e.g., a fingerprint sensor, an HRM sensor), a temperature sensor, a humidity sensor, and an illuminance sensor. According to an embodiment, the sensor module may include an optical sensor, and/or may be aligned with an opening (e.g., a through hole or a notch) formed in the flexible display 30 to be located inside the electronic device 2. External light may be introduced into the optical sensor by being transmitted through the opening and/or a partial area of the transparent cover overlapping the opening.

According to an embodiment, the sensor module may be disposed at a lower end of at least a part of the screen S of the flexible display 30, and/or may perform a related function while the position of the sensor module is not visually distinguished (or exposed). For example, the sensor module may be located at a rear surface of the screen S of the flexible display 30 and/or below or beneath the screen S of the flexible display 30. The sensor module may be located to be aligned with a recess formed on the rear surface of the flexible display 30. When viewed from the top of the screen S (e.g., when viewed in the −z-axis direction), the sensor module may be disposed to overlap at least a part of the screen S to perform the corresponding function without being exposed to the outside. A partial area of the flexible display 30 at least partially overlapping the sensor module may include a different pixel structure and/or wiring structure compared to other areas. For example, the partial area of the flexible display 30 at least partially overlapping the sensor module may have a different pixel density compared to other areas. The pixel structure and/or wiring structure formed in the partial area of the flexible display 30 at least partially overlapping the sensor module may reduce the loss when various types of signals related to the sensor module (e.g., light or ultrasonic wave) pass between the outside and the sensor module. According to an embodiment, a plurality of pixels may not be arranged in the partial area of the flexible display 30 at least partially overlapping the sensor module.

According to an embodiment, the electronic device 2 may include one or more key input devices 275 (e.g., the input module 150 of FIG. 1). In an embodiment (not shown), the key input device may include at least one sensor module.

According to various embodiments, the electronic device 2 may omit at least one of the elements and/or additionally include another element. For example, the electronic device 2 may include a microphone located inside the housing 20 and/or a microphone hole formed through the housing 20 to correspond thereto. According to an embodiment, the electronic device 2 may include a plurality of microphones capable of detecting the direction of sound. For example, the electronic device 2 may include a speaker located inside the housing 20 and/or a speaker hole formed through the housing 20 to correspond thereto. For example, the electronic device 2 may include a receiver for a call located inside the housing 20 and/or a receiver hole formed through the housing 20 to correspond thereto. In an embodiment, a microphone hole and/or a speaker hole may be implemented as one hole, and/or a speaker hole may be omitted, as in a piezo speaker. For example, the electronic device 2 may include a connector (e.g., a USB connector) (e.g., the connection terminal 178 of FIG. 1) located inside the housing 20 and/or a connector hole formed through the housing 20 to correspond thereto. The electronic device 2 may transmit and/or receive power and/or data with an external electronic device electrically connected to the connector via the connector hole. According to various embodiments, the electronic device 2 may include the electronic device 101 of FIG. 1 and/or at least one of elements of the electronic device 101 of FIG. 1.

Figure 4:
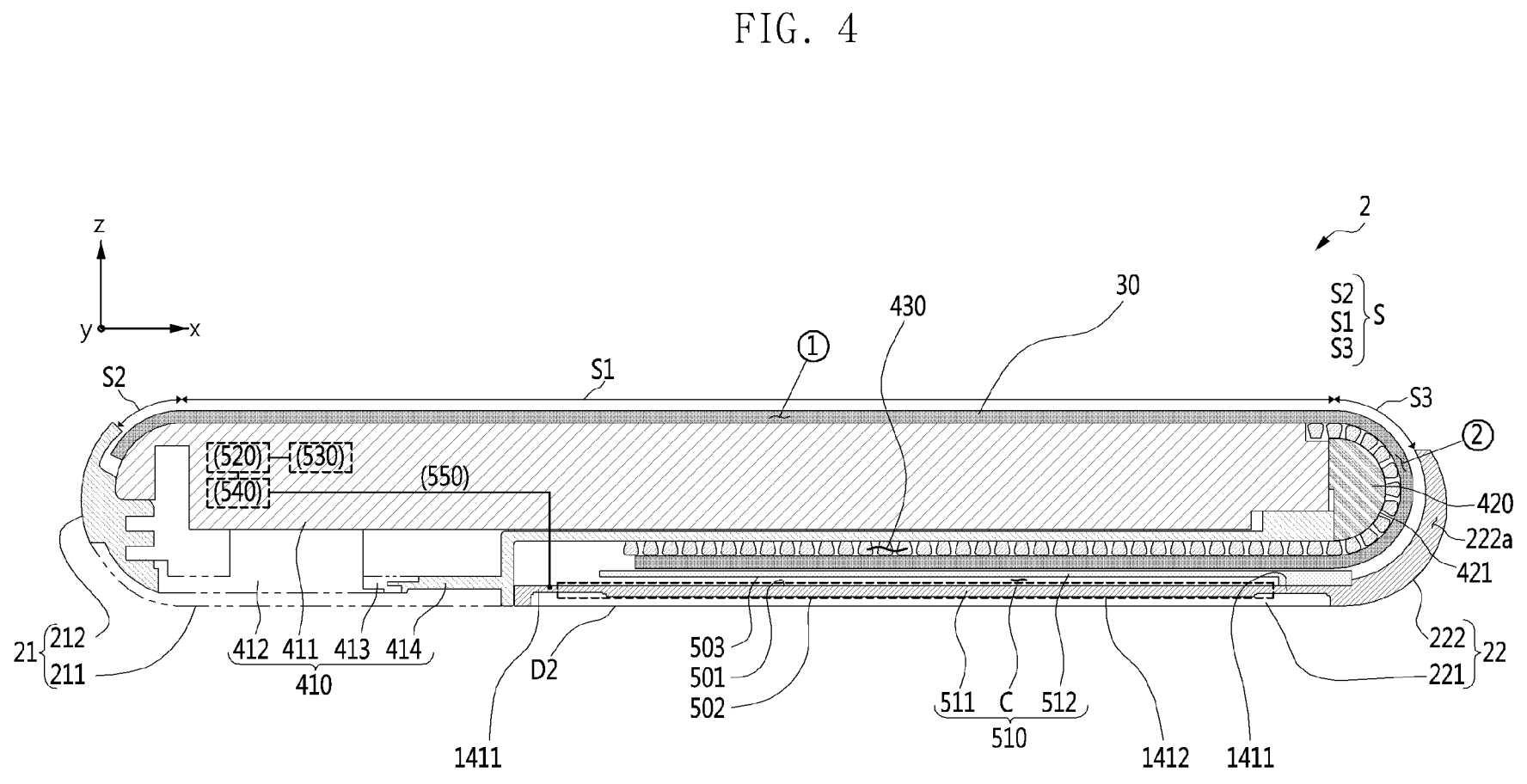
Figure 5:
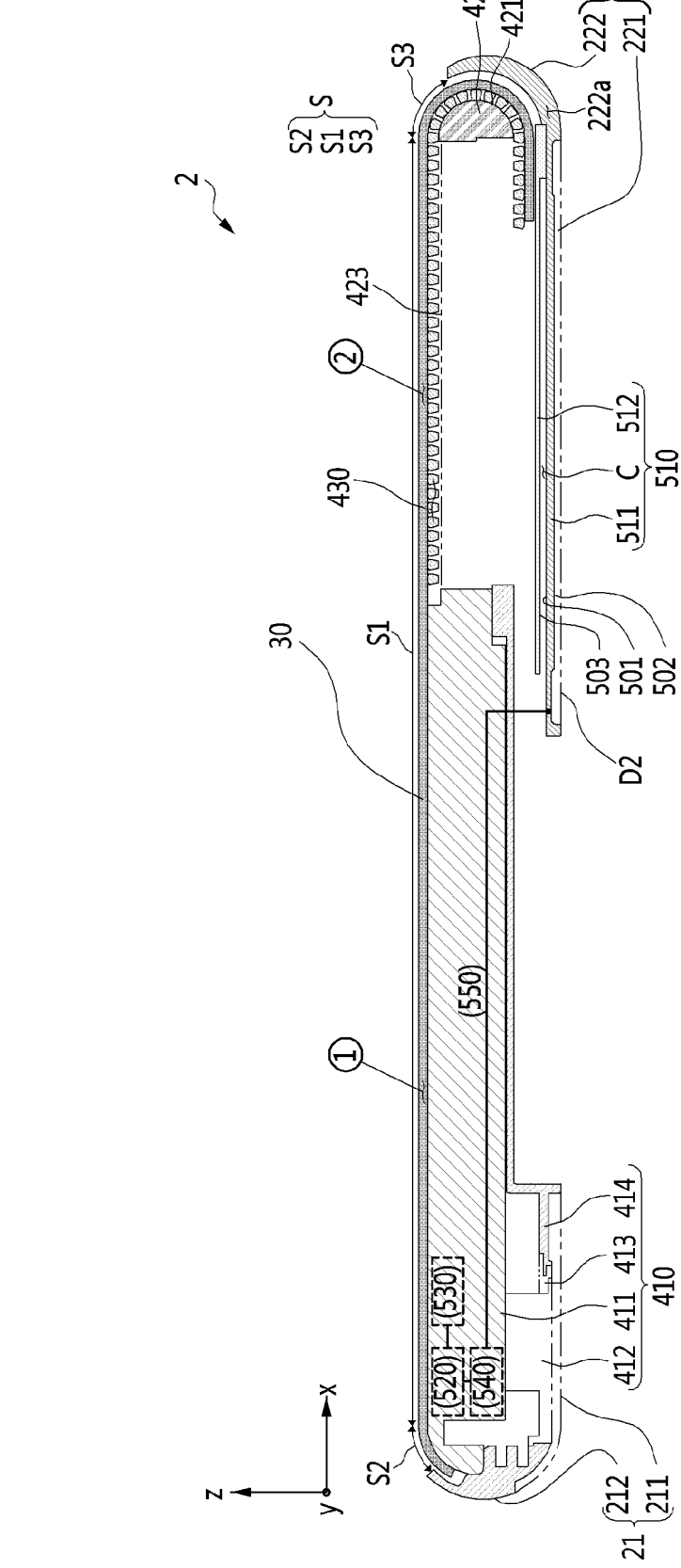
FIG. 5 illustrates a cross-sectional structure of an electronic device taken along line B-B' in FIG. 3A according to an embodiment.

FIG. 4 illustrates a cross-sectional structure of an electronic device 2 taken along line A-A' in FIG. 2A according to an embodiment. FIG. 5 illustrates a cross-sectional structure of an electronic device 2 taken along line B-B' in FIG. 3A according to an embodiment.

Referring to FIGS. 4 and 5, the electronic device 2 may include a first housing 21, a second housing 22, a first support structure 410, a second support structure 420, a flexible display 30, a display support structure 430, a cavity structure 510, and a processor 520 (e.g., the processor 120 of FIG. 1), a memory 530 (e.g., the memory 130 of FIG. 1), a wireless communication circuit 540 (e.g., the wireless communication module 192 of FIG. 1), and/or a transmission line 550. The first housing 21 may include a first back cover 211 and a first side cover 212. The second housing 22 may include a second back cover 221 and a second side cover 222.

According to an embodiment, the first support structure 410 may be coupled to the first housing 21 or integrally formed to the first housing 21. The first area ① of the flexible display 30 may be bonded to the first support structure 410 using, for example, various adhesive members (e.g., a thermally reactive adhesive member, a photo-reactive adhesive member, a general adhesive and/or double-sided tape). The first support structure 410, which has a frame structure capable of enduring a load, may contribute to the durability or rigidity of the electronic device 2. The first support structure 410 may include, for example, an assembly to which a plurality of support members 411, 412, 413, and 414 are coupled. As another example, the first support structure 410 may be integrally formed with a plurality of support members 411, 412, 413, and 414. The first support structure 410 is not limited to the illustrated example and may be implemented in various other forms. The first housing 21 may be disposed on or coupled to the first support structure 410. A printed circuit board (not shown) on which the processor 520, the memory 530, the wireless communication circuit 540, and/or an interface (e.g., the interface 177 in FIG. 1) is disposed may be disposed on or coupled to the first support structure 410. The electronic device 2 may include various other elements (e.g., at least one among the elements included in the electronic device 101 of FIG. 1) arranged on the printed circuit board and/or electrically connected to the printed circuit board. For example, the electronic device 2 may include a battery (e.g., the battery 189 of FIG. 1) located in the first housing 21 or the second housing 22.

According to an embodiment, the second support structure 420 may be coupled to the second housing 22 or integrally formed with the second housing 22 to correspond to the first cover portion 222a of the second side cover 222. The second support structure 420 may include, for example, a curved support member including a curved surface portion 421 facing the first cover portion 222a. One end of the second support structure 420 may be coupled to the second cover portion 222b of FIG. 2A or 3A and/or a separate support member disposed on the second cover portion 222b. The other end of the second support structure 420 may be coupled to the third cover portion 222c of FIG. 2A or 3A and/or a separate support member disposed on the third cover portion 222c. In the slide-out of the second housing 22, the first cover portion 222a of the second housing 22 may be spaced apart from the first support structure 410 coupled to the first area ① of the flexible display 30, and/or at least a part of the second area ② included in the flexible display 30 may be withdrawn to the outside through a curved space between the first cover portion 222a and the second support structure 420. In the slide-in, the first cover portion 222a of the second housing 22 may be brought close to the first support structure 410 coupled to the first area ①, and/or at least a part of the second area ② may be drawn into the housing 20 through the curved space between the first cover portion 222a and the second support structure 420.

According to an embodiment, the display support structure 430 may be disposed on the rear surface of the second area ② included in the flexible display 30. The rear surface of the flexible display 30 may refer to a surface located opposite to a surface on which light is emitted from a display panel including a plurality of pixels. In the slide-out or slide-in of the second housing 22, the display support structure 430 may be movable along the curved surface portion 421 of the second support structure 420. The display support structure 430 may support the second area ② of the flexible display 30 so that the second area ② may be maintained in a form smoothly connected to the first area ① of the flexible display 30. In the closed state and/or the open state of the electronic device 2, a part of the display support structure 430 may support the second area ② between the curved surface portion 421 of the second support structure 420 and the second area ②. In the open state of the electronic device 2, for example, a part of the display support structure 430 may overlap the first flat surface portion S1 included in the screen S, and/or may support the first flat surface portion S1 between one surface (or a support surface) of a support member disposed on and/or coupled to the second housing 22 and the first flat surface portion S1. The display support structure 430, for example, may contribute to being movable while maintaining a form in which the second area ② is smoothly connected to the first area ① in the switching between the closed state (see FIG. 4) and the open state (see FIG. 5) of the electronic device 2.

According to an embodiment, in the electronic device 2, a rail portion (e.g., a guide rail) for guiding the movement of the display support structure 430 may be implemented. For example, a separate support member disposed on the second cover portion 222*b* and/or the second cover portion 222*b* of FIG. 2A or 3A may include a first guide rail on which one side of the display support structure 430 is located. A separate support member disposed on the third cover portion 222*c* and/or the third cover portion 222*c* of FIG. 2A or 3A may include a second guide rail on which the other side of the display support structure 430 is located. The first guide rail and the second guide rail may include grooves or recesses to correspond to a movement path of the display support structure 430.

According to an embodiment, the display support structure 430 may include a multi-bar structure (or a multi-bar assembly). The multi-bar structure may include a form in which a plurality of bars extending in the third direction (e.g., the y-axis direction, or the direction between the second cover portion 222*b* and the third cover portion 222*c* of FIG. 2A) orthogonal to the direction (e.g., the +x-axis direction) of the slide-out are arranged along the second area ② of the flexible display 30. In an embodiment, the multi-bar structure may be referred to as another term such as a "flexible track".

According to various embodiments (not shown), the electronic device 2 may further include a support sheet attached to the rear surface of the flexible display 30. The display support structure 430 may be disposed on the support sheet. The rear surface of the flexible display 30 may refer to a surface located opposite to a surface through which light is emitted from a display panel including a plurality of pixels. The support sheet may contribute to the durability of the flexible display 30. The support sheet may reduce the effect of load or stress on the flexible display 30 which may occur in the switching between the closed state of FIG. 4 and the open state of FIG. 5. The support sheet may prevent the flexible display 30 from being damaged by the force transmitted from the second housing 22 when the second housing is moved. The support sheet may be formed of various metal materials and/or non-metal materials (e.g., polymer). In an embodiment, the support sheet may include stainless steel and/or the like. In another embodiment, the support sheet may include engineering plastic and/or the like. According to an embodiment, the support sheet may be integrally implemented with the flexible display 30.

According to an embodiment, the support sheet may include a lattice structure which may at least partially overlap a portion where the flexible display 30 is bent (e.g., the second area ②, the first curved surface portion S2 of the screen S). The lattice structure may include, for example, a plurality of openings (or slits). For example, a plurality of openings may be formed periodically, may have substantially the same shape, and/or may be repeatedly arranged at regular intervals. The lattice structure may contribute to the flexibility of the second area ②, and/or the second area ② may be more flexible than the first area ① due to the lattice structure. In an embodiment, the support sheet may include a recess pattern (not shown) including a plurality of recesses, replacing the lattice structure. According to various embodiments, the lattice structure or recess pattern contributing to the flexibility of the flexible display 30 may expand to at least a part of the first flat surface portion S1 of the screen S. According to various embodiments, the support sheet including the lattice structure or recess pattern or a conductive member corresponding thereto may be formed in a plurality of layers.

In a state where the screen S is expanded (e.g., the open state of FIG. 5), a non-smooth screen may be formed due to lifting by the elasticity of the flexible display 30 and/or the support sheet. According to an embodiment, in order to prevent the lifting phenomenon, a tension structure (not shown) may be formed with respect to the flexible display 30 and/or the support sheet. The tension structure may contribute to a smooth slide operation while maintaining tension acting on the flexible display 30 and/or the support sheet.

According to an embodiment, in order to reduce frictional force between the curved surface portion 421 of the second support structure 420 and the display support structure 430, the surface of the curved surface portion 421 and/or the surface of the display support structure 430 may be lubricated, and/or a lubricant (e.g., grease) may be interposed between the curved surface portion 421 and the display support structure 430.

According to an embodiment, the second support structure 420 may be replaced with a rotation member such as a roller or a pulley. For example, one end of a rotation shaft of the rotation member may be rotatably coupled to the second cover portion 222*b* of FIG. 2A or 3A and/or to a separate support member disposed on the second cover portion 222*b*. The other end of the rotation shaft of the rotation member may be rotatably coupled to the third cover portion 222*c* of FIG. 2A or 3A and/or to a separate support member disposed on the third cover portion 222*c*. In an embodiment, the rotation member may be defined as a curved surface support member rotatably implemented based on friction with the display support structure 430.

According to an embodiment, the cavity structure 510 may include a first conductive portion 511 and a second conductive portion 512. The first conductive portion 511 and/or the second conductive portion 512 may be electrically connected to each other. The cavity structure 510 may include a cavity C between the first conductive portion 511 and the second conductive portion 512. The cavity C may refer to a separation space between the first conductive portion 511 and the second conductive portion 512. The cavity structure 510 may be located in the second housing 22.

According to an embodiment, the first conductive portion 511 may be connected to the second side cover 222, and/or may be integrally formed with the second side cover 222. For example, the first conductive portion 511 may include a first conductive plate including a first surface 501 facing a direction (e.g., the +z-axis direction) which the screen S faces and a second surface 502 facing a direction opposite to the first surface 501. The second back cover 221 may be disposed on the second surface 502 of the first conductive portion 511. The second surface 502 may include, for example, a recess (not shown), and the second back cover 221 may be located in the recess. The second conductive portion 512 may be located facing the first surface 501 of the first conductive portion 511. The second conductive portion 512 may include a third surface 503 facing the first surface 501 of the first conductive portion 511. The second conductive portion 512 may include, for example, a second conductive plate which at least partially overlaps the first conductive portion 511 when viewed from the top of the second back cover 221 (e.g., when viewed in the +z-axis direction). In an embodiment, the second back cover 221 may be omitted, and/or the second rear surface D2 of the second housing 22 may be implemented to be formed by the first conductive portion 511.

According to an embodiment, the cavity structure 510 may operate as an antenna structure and/or an antenna radiator capable of radiating electromagnetic waves using the cavity C. The wireless communication circuit 540 may be configured to transmit and/or receive signals of a selected and/or designated frequency band using the cavity structure 510. An antenna capable of radiating electromagnetic waves by supplying power to the cavity C of the cavity structure 510 may be implemented.

According to an embodiment, the transmission line 550 may electrically connect the wireless communication circuit 540 and the first conductive portion 511 to each other. For example, the first conductive portion 511 may include a portion extending further toward the first boundary portion B1 (see FIG. 2B or 3B) compared to the second conductive portion 512, and/or the transmission line 550 may be electrically connected to the extending portion. The transmission line 550 may transmit a radio frequency (RF) signal (voltage, current) between the wireless communication circuit 540 and the first conductive portion 511. The transmission line may include, for example, various types of conductive structures electrically connecting the wireless communication circuit 540 and the first conductive portion 511 and/or an electrical path (e.g., a flexible printed circuit board (FPCB) or a cable) implemented by wire. If the wireless communication circuit 540 supplies a radiation current (e.g., current related to a frequency) to the first conductive portion 511, an electromagnetic field (e.g., an electric field and a magnetic field) radiated by the cavity C may be formed. The wireless communication circuit 540 may transmit and/or receive a signal of a selected and/or designated frequency band via an electromagnetic field radiated by the cavity C. Surface current in the form of alternating current flowing via the first surface 501 of the first conductive portion 511 and/or the third surface 503 of the second conductive portion 512 due to the feeding of the wireless communication circuit 540 may form an electromagnetic field (e.g., an electric field or a magnetic field) according to a change in current.

According to an embodiment, the second conductive portion 512 may be electrically connected to the ground via various electrical paths. The ground may include, for example, a ground plane disposed on a printed circuit board located in the first housing 21.

According to another embodiment, instead of the first conductive portion 511, the second conductive portion 512 may be electrically connected to the wireless communication circuit 540 via the transmission line 550. Due to substantially the same operation principle as the embodiment in which the first conductive portion 511 and the wireless communication circuit 540 are electrically connected to each other, the wireless communication circuit 540 may transmit and/or receive a signal of a selected and/or designated frequency band via an electromagnetic field radiated by the cavity C. When the second conductive portion 512 is electrically connected to the wireless communication circuit 540, the first conductive portion 511 may be electrically connected to the ground (e.g., a ground plane disposed on a printed circuit board located in the first housing 21).

According to an embodiment, a support member 414 of the first support structure 410 may be in contact with the cavity structure 510 (or the first conductive portion 511) in the closed state of the electronic device 2. The support member 414 may be formed of a non-conductive material, and may thus reduce the effect on antenna performance of an antenna utilizing the cavity structure 510.

In an embodiment, a frequency band configured for the wireless communication circuit 540 to transmit and/or receive via the cavity structure 510 may include, for example, at least one among low band (LB) (about 600 MHz to about 1 GHz), middle band (MB) (about 1 GHz to about 2.3 GHz), high band (HB) (about 2.3 GHz to about 2.7 GHz), and/or ultra-high band (UHB) (about 2.7 GHz to about 6 GHz). The frequency band configured for the wireless communication circuit 540 to transmit and/or receive via the cavity structure 510 may also include various other frequencies.

According to an embodiment, the second back cover 221 may include a non-conductive material (e.g., polymer). In an embodiment, the second back cover 221 may include a conductive material. The second back cover 221 may be electrically connected to the first conductive portion 511 to operate as a part of an antenna radiator.

According to an embodiment, a dielectric may be located between the first conductive portion 511 and the second conductive portion 512 of the cavity structure 510. The dielectric may have a permittivity which does not degrade the antenna performance of an antenna utilizing the cavity structure 510 to a critical level. In an embodiment, the dielectric may include an adhesive material, and/or may contribute to the durability (e.g., durability of the bonding between the first conductive portion 511 and the second conductive portion 512) of the cavity structure 510.

According to an embodiment, the second conductive portion 512 may be implemented as a flexible printed circuit board.

According to an embodiment, depending on the shape of the first conductive portion 511, the second conductive portion 512, and/or the cavity C, the resonant frequency, bandwidth, and/or antenna gain for an antenna utilizing the cavity structure 510 may vary. For example, the height (H) of the cavity C (e.g., the distance between the first surface 501 and the third surface 503 in the z-axis direction) may be about 1 mm or less (e.g., about 0.4 mm).

Figure 6:
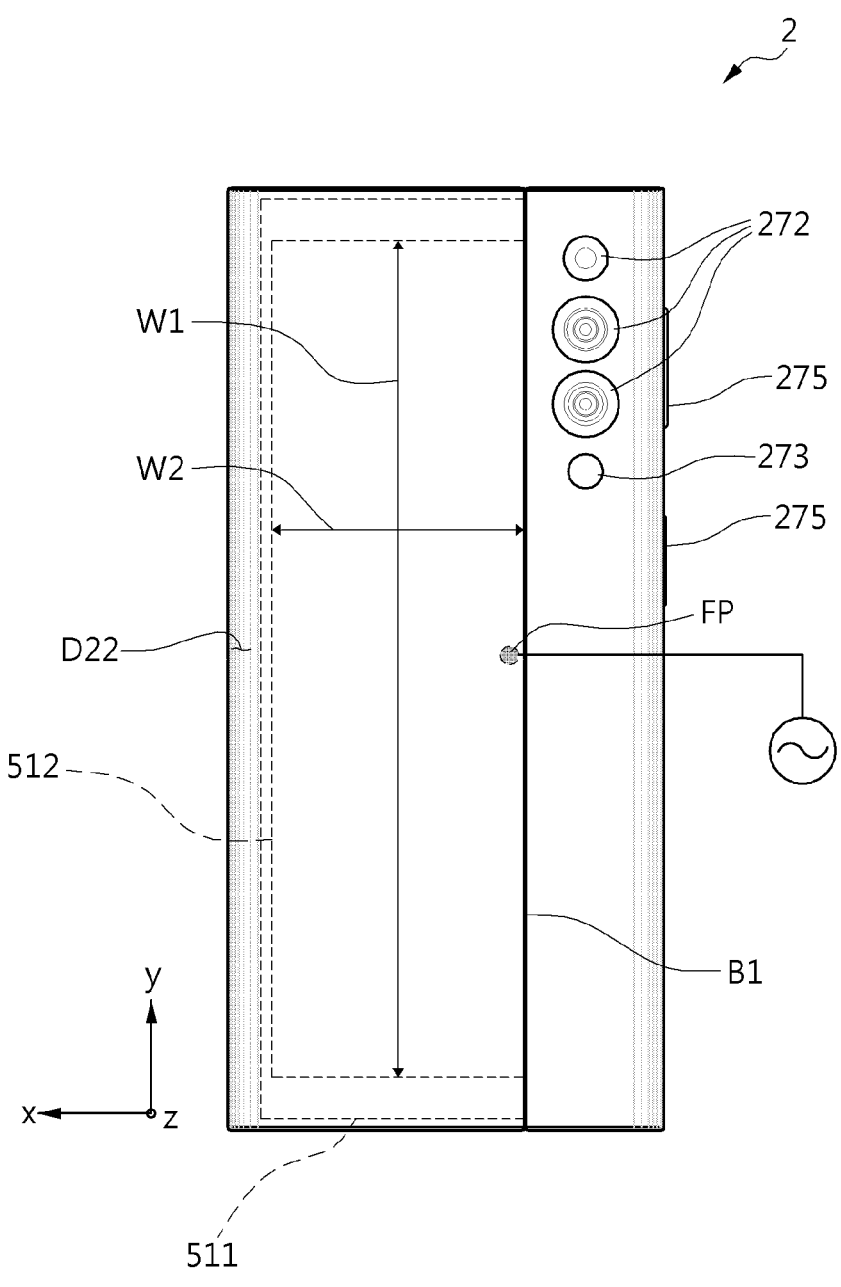
FIG. 6 is a rear view of an electronic device including a cavity in a closed state according to an embodiment.
Figure 7:
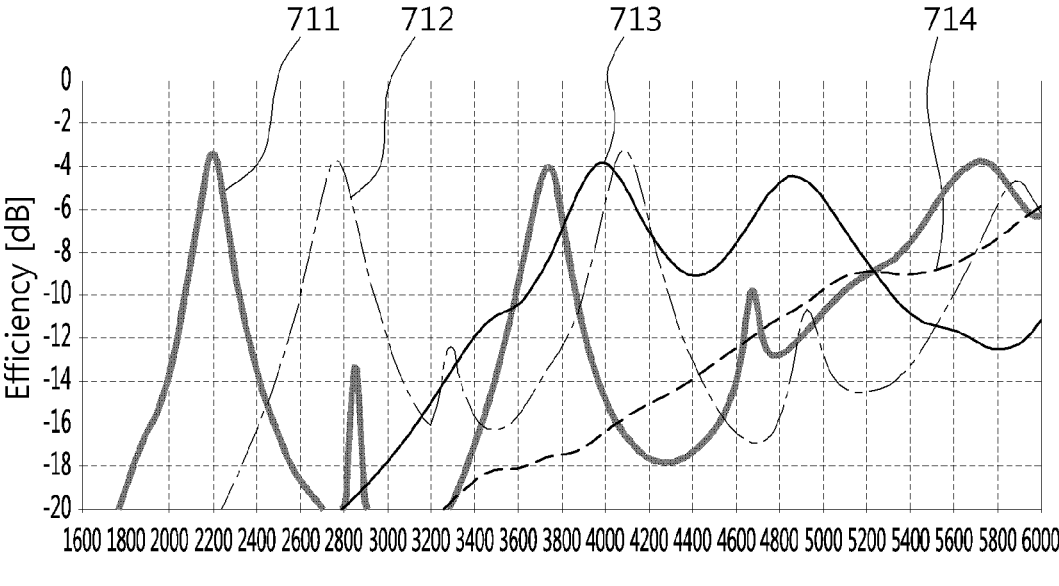
FIG. 7 is a graph showing antenna performance with respect to an antenna utilizing a cavity structure according to a first width of a second conductive portion in the y-axis direction, according to an embodiment.
Figure 8:
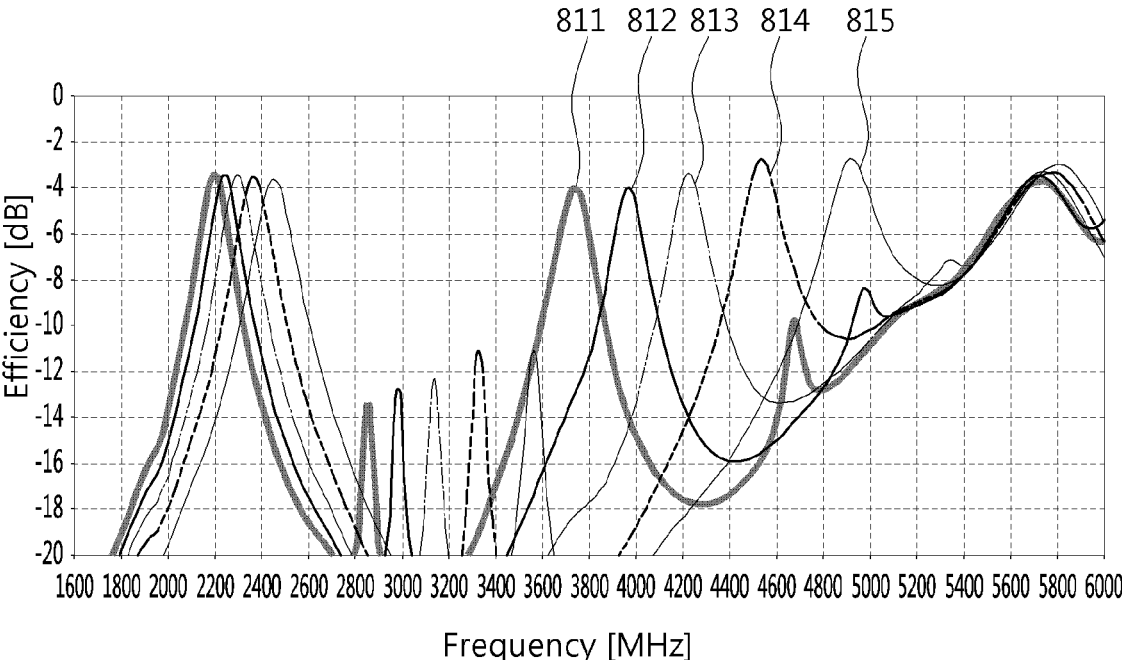
FIG. 8 is a graph showing antenna performance with respect to an antenna utilizing a cavity structure according to a second width of a second conductive portion in the x-axis direction, according to an embodiment.

FIG. 6 is a rear view of an electronic device 2 including a cavity in a closed state according to an embodiment. FIG. 7 is a graph showing antenna performance with respect to an antenna utilizing a cavity structure 510 (see FIG. 4 or FIG. 5) according to a first width (W1) of a second conductive portion 512 in the y-axis direction, according to an embodiment. FIG. 8 is a graph showing antenna performance with respect to an antenna utilizing a cavity structure 510 according to a second width (W2) of a second conductive portion 512 in the x-axis direction, according to an embodiment.

In an embodiment, and referring to FIGS. 6 and 7, reference numeral "711" is a graph showing antenna efficiency when a first width W1 is a first value. Reference numeral "712" is a graph showing antenna efficiency when the first width W1 is about 10 mm smaller than the first value. Reference numeral "713" is a graph showing antenna efficiency when the first width W1 is about 20 mm smaller than the first value. Reference numeral "714" is a graph showing antenna efficiency when the first width W1 is about 30 mm smaller than the first value. The size of the cavity C (see FIG. 4 or FIG. 5) between the first conductive portion 511 and the second conductive portion 512 may vary according to the value of the first width W1, and accordingly, the frequency characteristics (e.g., resonant frequency) of the antenna utilizing the cavity C of the cavity structure 510 may vary.

In an embodiment and referring to FIGS. 6 and 8, reference numeral "811" is a graph showing antenna efficiency when a second width W2 is a second value. Reference numeral "812" is a graph showing antenna efficiency when the second width W2 is about 10 mm smaller than the second value. Reference numeral "813" is a graph showing antenna efficiency when the second width W2 is about 20 mm smaller than the second value. Reference numeral "814" is a graph showing antenna efficiency when the second width W2 is about 30 mm smaller than the second value. Reference numeral "815" is a graph showing antenna efficiency when the second width W2 is about 40 mm smaller than the second value. The size of the cavity C (see FIG. 4 or FIG. 5) between the first conductive portion 511 and the second conductive portion 512 may vary according to the value of the second width W2, and accordingly, the frequency characteristics (e.g., resonant frequency) of the antenna utilizing the cavity C of the cavity structure 510 may vary.

According to various embodiments, the resonant frequency of the antenna utilizing the cavity C of the cavity structure 510 may vary according to the width of the first conductive portion 511 in the y-axis direction and/or the width of the first conductive portion 511 in the x-axis direction.

According to an embodiment, a feeding point FP may be located on the first conductive portion 511 and/or the second conductive portion 512. For example, the feeding point FP may be located adjacent to a substantial center of the cavity C in the y-axis direction. The feeding point FP may be located closer to the first boundary portion B1 than the fourth curved surface portion D22. The position and/or number of the feeding points FPs may not be limited to the embodiment of FIG. 6 and may be various. The resonant frequency, bandwidth, and/or antenna gain for an antenna utilizing the cavity structure 510 may vary according to the positions and/or number of the feeding points.

Figure 9A:
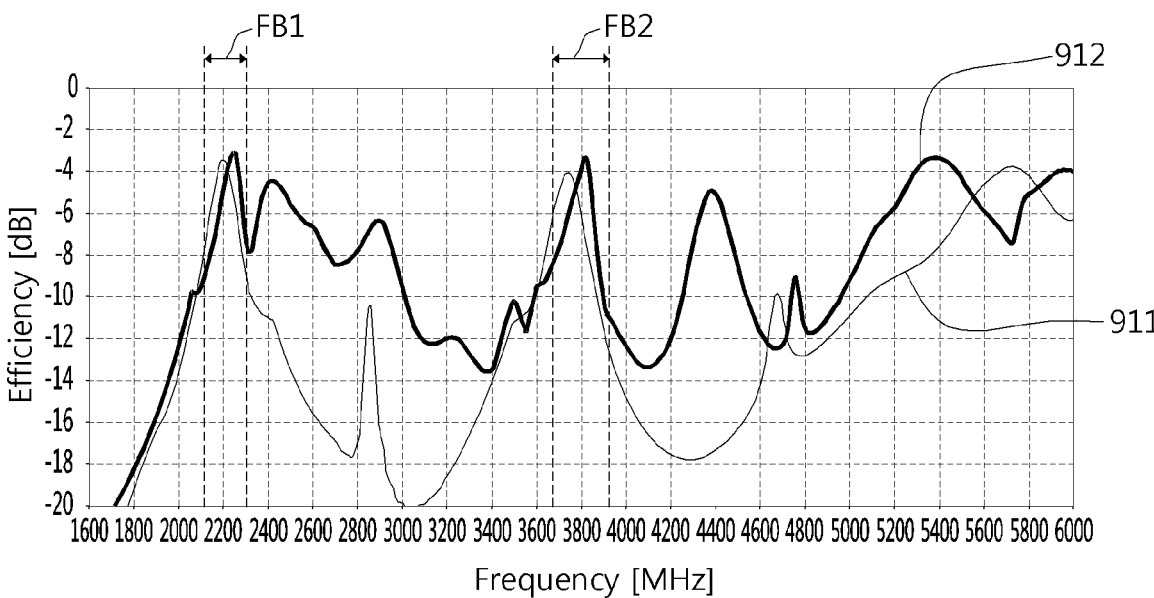
FIG. 9A is a graph showing antenna performance with respect to an antenna utilizing a cavity structure according to an embodiment.
Figure 9B:
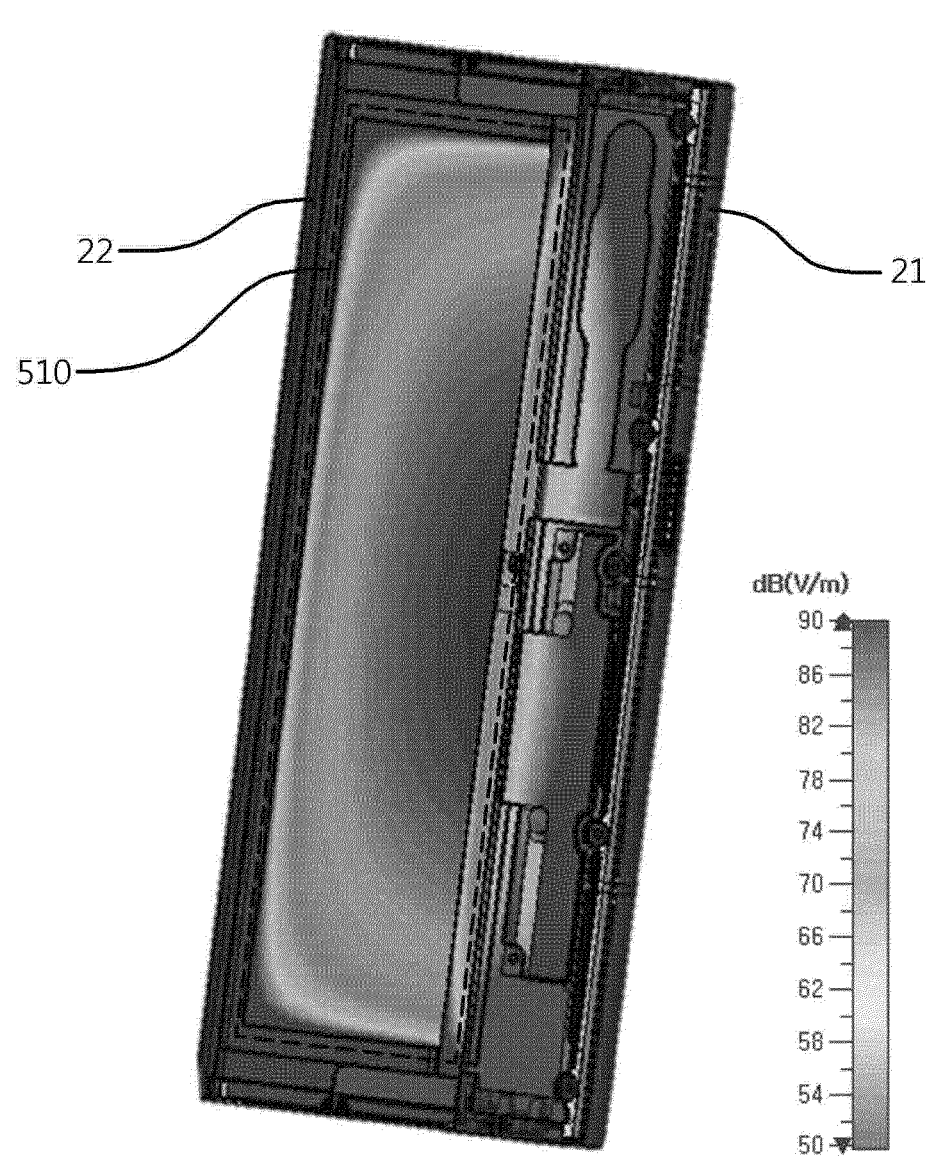
FIG. 9B illustrates electromagnetic field distribution with respect to an antenna utilizing a cavity structure in a closed state of an electronic device according to an embodiment.
Figure 9C:
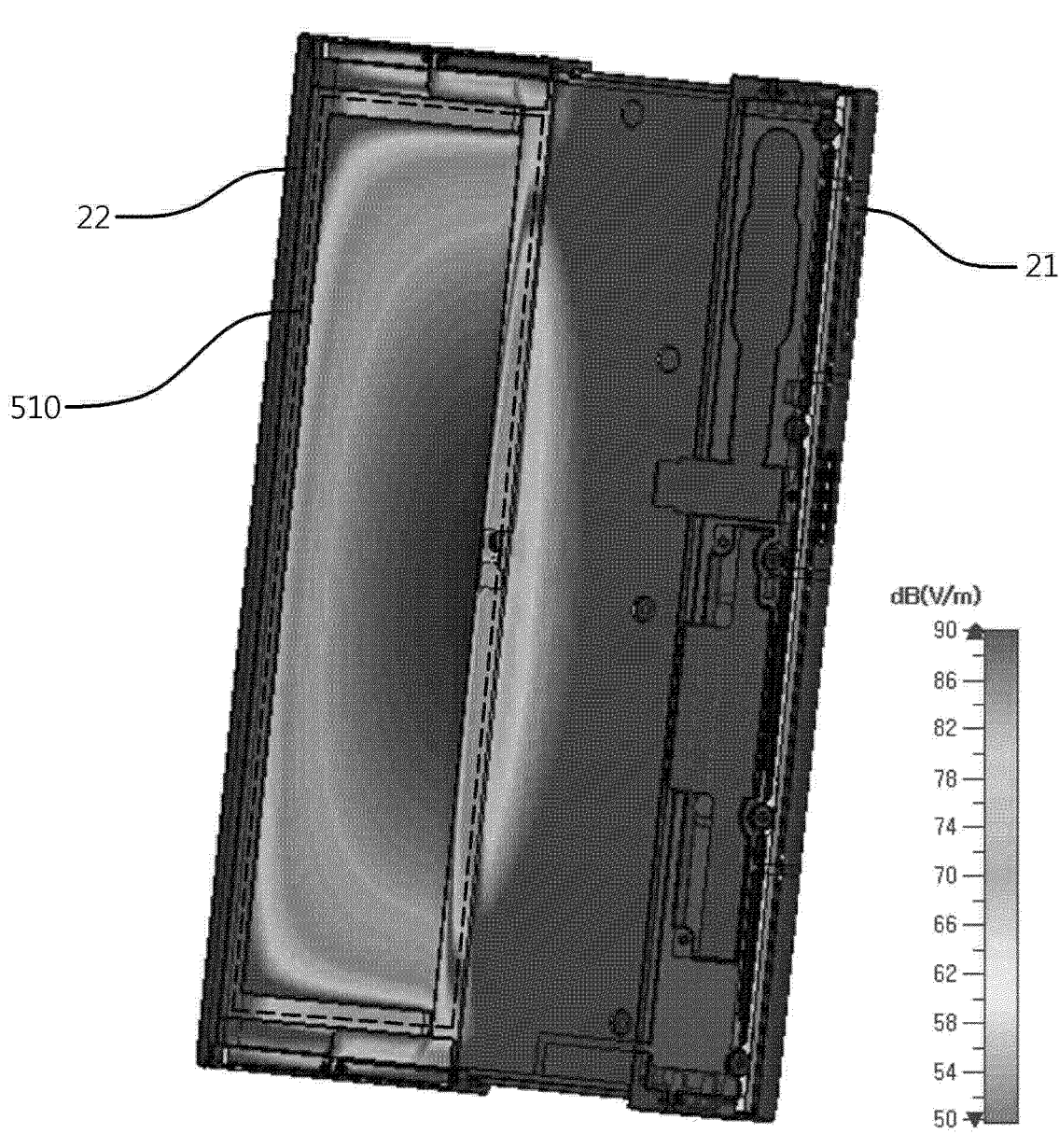
FIG. 9C illustrates electromagnetic field distribution with respect to an antenna utilizing a cavity structure in an open state of an electronic device according to an embodiment.

FIG. 9A is a graph showing antenna performance with respect to an antenna utilizing a cavity structure 510 according to an embodiment. FIG. 9B illustrates electromagnetic field distribution with respect to an antenna utilizing a cavity structure 510 in a closed state of an electronic device 2 according to an embodiment. FIG. 9C illustrates electromagnetic field distribution with respect to an antenna utilizing a cavity structure 510 in an open state of an electronic device 2 according to an embodiment.

In an embodiment, and referring to FIG. 9A, reference numeral "911" is a graph showing the ratio of input voltage to output voltage on the frequency distribution in the closed state of the electronic device 2. Reference numeral "912" is a graph showing the antenna efficiency in the open state of the electronic device 2. A used frequency band transmitted and/or received via the antenna may be, for example, a first frequency band FB1 included in about 2000 MHz to about 2400 MHz, and/or a second frequency band FB2 included in about 3600 MHz to about 4000 MHz. The antenna utilizing the cavity C (see FIG. 4 or FIG. 5) of the cavity structure 510 may reduce, in the used frequency band, a difference between antenna performance in the closed state of the electronic device 2 and/or antenna performance in the open state of the electronic device 2.

Figure 10A:
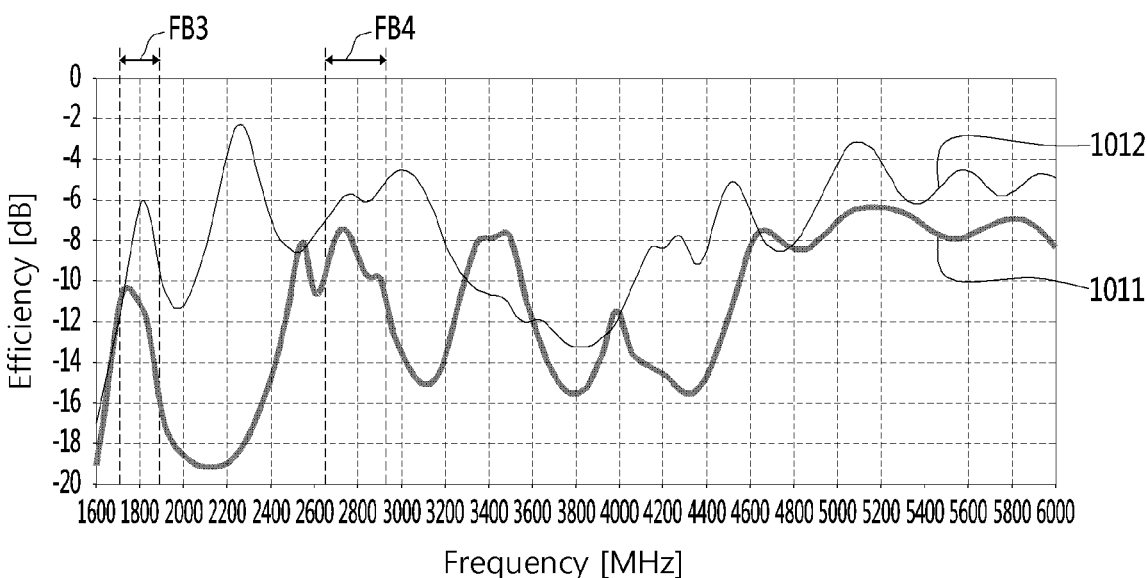
FIG. 10A is a graph showing antenna performance with respect to an antenna utilizing a first conductive portion in an embodiment in which a second conductive portion is omitted.
Figure 10B:
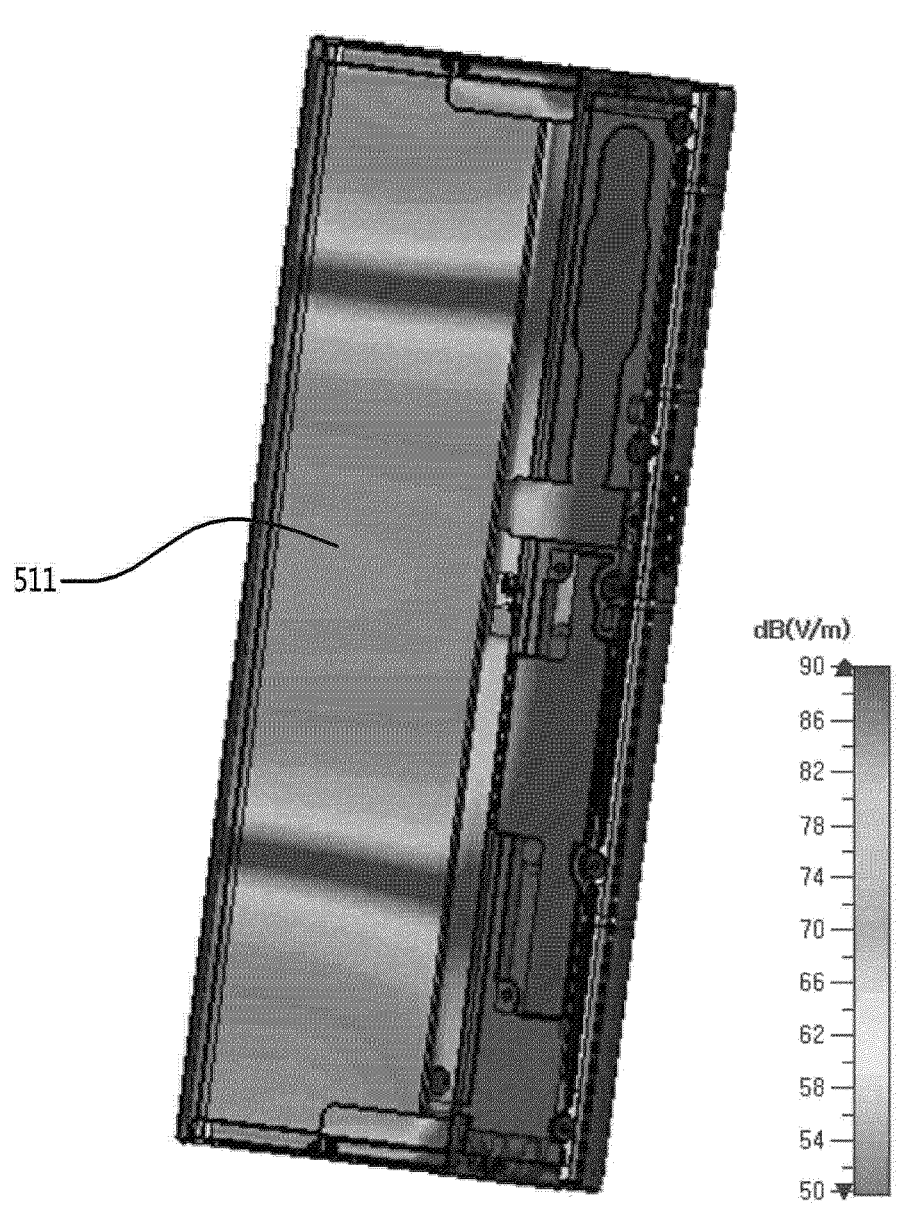
FIG. 10B illustrates electromagnetic field distribution with respect to an antenna utilizing a first conductive portion in a closed state of an electronic device.
Figure 10C:
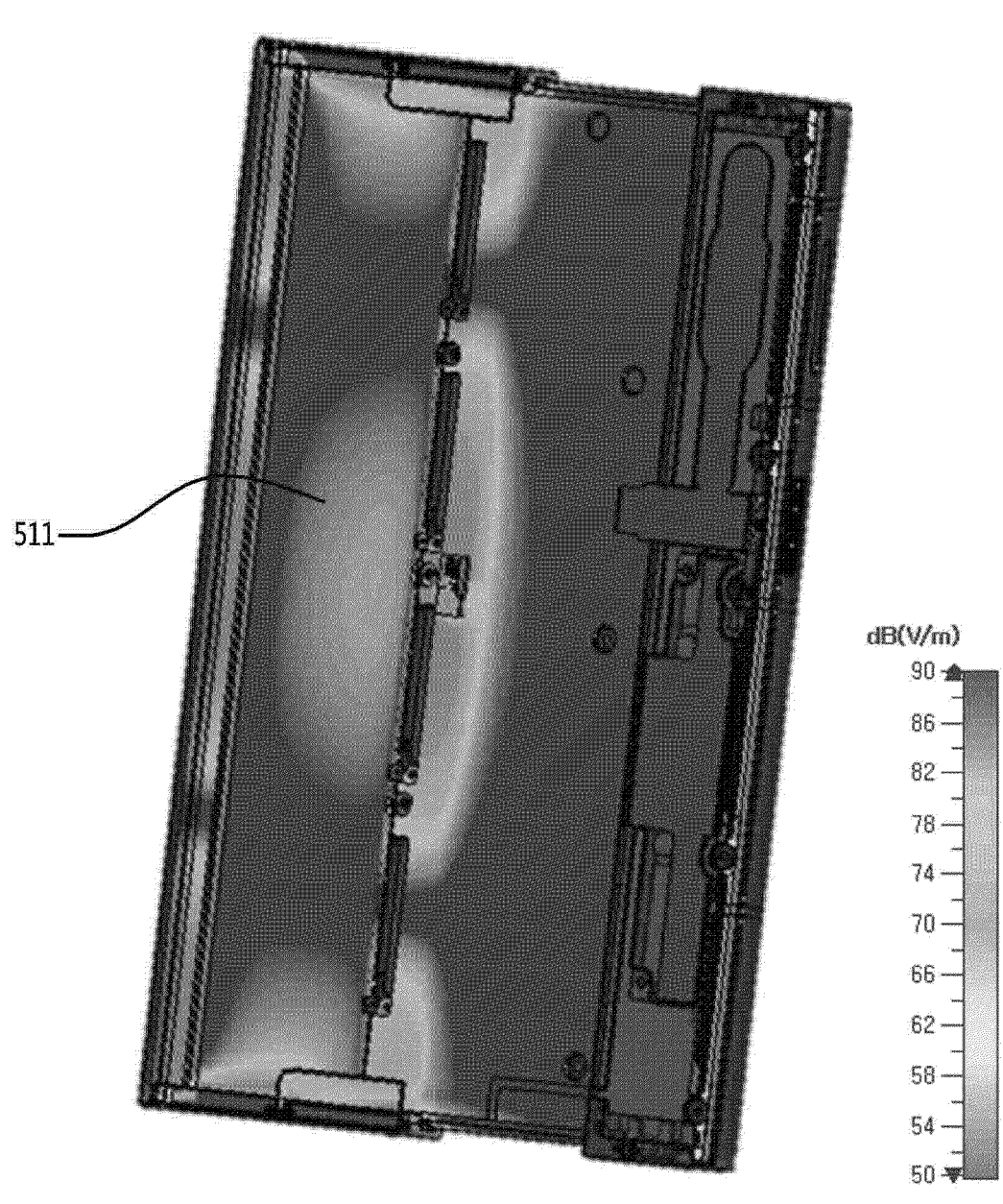
FIG. 10C illustrates electromagnetic field distribution with respect to an antenna utilizing a first conductive portion in an open state of an electronic device.

In an embodiment, FIG. 10A is, for example, a graph showing antenna performance with respect to an antenna utilizing a first conductive portion 511 in an embodiment in which a second conductive portion 512 is omitted. FIG. 10B illustrates, for example, electromagnetic field distribution with respect to an antenna utilizing a first conductive portion 511 in a closed state of an electronic device. FIG. 10C illustrates, for example, electromagnetic field distribution with respect to an antenna utilizing a first conductive portion 511 in an open state of an electronic device.

In an embodiment, referring to FIG. 10A, reference numeral "1011" is a graph showing antenna efficiency in the closed state of the electronic device. Reference numeral "1012" is a graph showing antenna efficiency in the open state of the electronic device. A used frequency band transmitted and/or received via the antenna may be, for example, a third frequency band FB3 included in about 1600 MHz to about 2000 MHz and/or a fourth frequency band FB4 included in about 2600 MHz to about 3000 MHz. The antenna utilizing the first conductive portion 511, in the used frequency band, may be more difficult to reduce the difference between antenna performance in the closed state of the electronic device and/or antenna performance in the open state of the electronic device, than the antenna utilizing the cavity structure 510.

In an embodiment and referring to FIGS. 4 and 5, the spatial positional relationship between the cavity structure 510 and various elements of the electronic device 2 may vary depending on the closed state or the open state of the electronic device 2. For example, in the closed state of the electronic device 2, a part of the second area ② of the flexible display 30 may be located between the first support 410 structure and the cavity structure 510. For example, when viewed from the top of the second rear surface D2 (e.g., when viewed in the +z-axis direction), a part of the second area ② of the flexible display 30 may be closer to and/or may overlap the cavity structure 510 more in the closed state than in the open state of the electronic device 2. Although the spatial positional relationship between the cavity structure 510 and various elements of the electronic device 2 may vary in the closed state or the open state of the electronic device 2, an antenna utilizing the cavity C of the cavity structure 510 may reduce the difference between antenna performance of the closed state of the electronic device 2 and/or antenna performance of the open state of the electronic device 2, compared to an antenna utilizing the first conductive portion 511. Referring to the electromagnetic field distributions shown in FIGS. 9B, 9C, 10B, and 10C, an antenna utilizing the cavity structure 510 may reduce the effect of elements around the antenna (e.g., a conductive material included in the flexible display 30) on antenna performance, compared to an antenna utilizing the first conductive portion 511. The cavity C of the cavity structure 510 may reduce the electromagnetic effect (e.g., electromagnetic interference (EMI), or crosstalk) on the antenna performance in the closed state and/or the open state of the electronic device 2.

According to various embodiments, the transmission line 550 may be included in a circuit which protects an internal circuit from an external electric shock. For example, an external electric shock may be static electricity introduced due to electrostatic discharge (ESD), and/or the transmission line 550 may be electrically connected to a device such as a varistor capable of absorbing static electricity.

Figure 11:
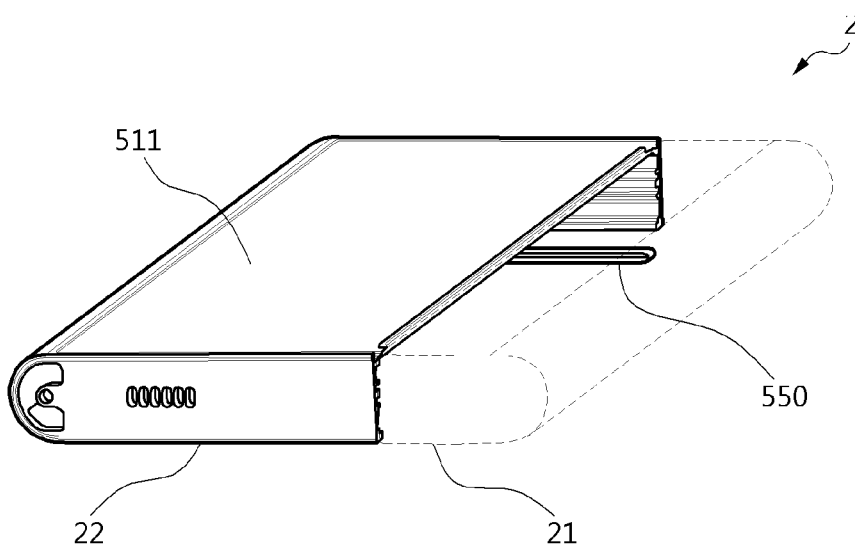
FIG. 11 illustrates a perspective view of a first housing, a second housing, and a transmission line, in a closed state of an electronic device according to an embodiment.
Figure 12:
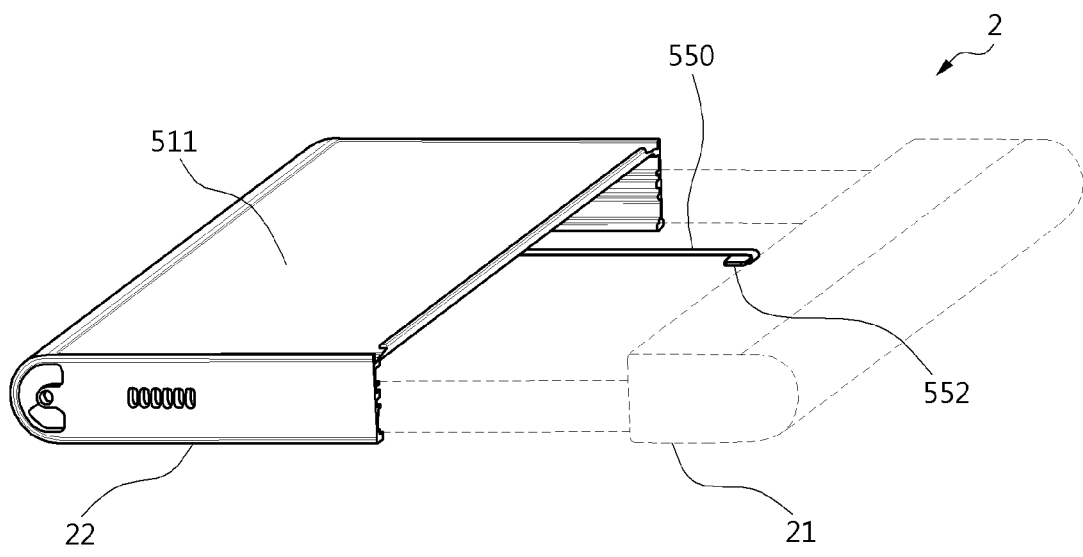
FIG. 12 illustrates a perspective view of a first housing, a second housing, and a transmission line, in an open state of an electronic device according to an embodiment.

FIG. 11 illustrates a first housing 21, a second housing 22, and a transmission line 550, in a closed state of an electronic device 2 according to an embodiment. FIG. 12 illustrates a first housing 21, a second housing 22, and a transmission line 550, in an open state of an electronic device 2 according to an embodiment.

Referring to FIGS. 11 and 12, in an embodiment, one end (not shown) of the transmission line 550 may be electrically connected to the first conductive portion 511 and/or the second conductive portion 512 (see FIG. 4 or FIG. 5) located in the second housing 22. The other end 552 of the transmission line 550 may be electrically connected to the wireless communication circuit 540 (see FIG. 4 or FIG. 5) located in the first housing 21. The transmission line 550 may include a flexible electrical path such as a flexible printed circuit board. The flexible transmission line 550 may be disposed without damage to correspond to the spatial positional relationship between the first housing 21 and the second housing 22 in the closed state and/or the open state of the electronic device 2.

Figure 13A:
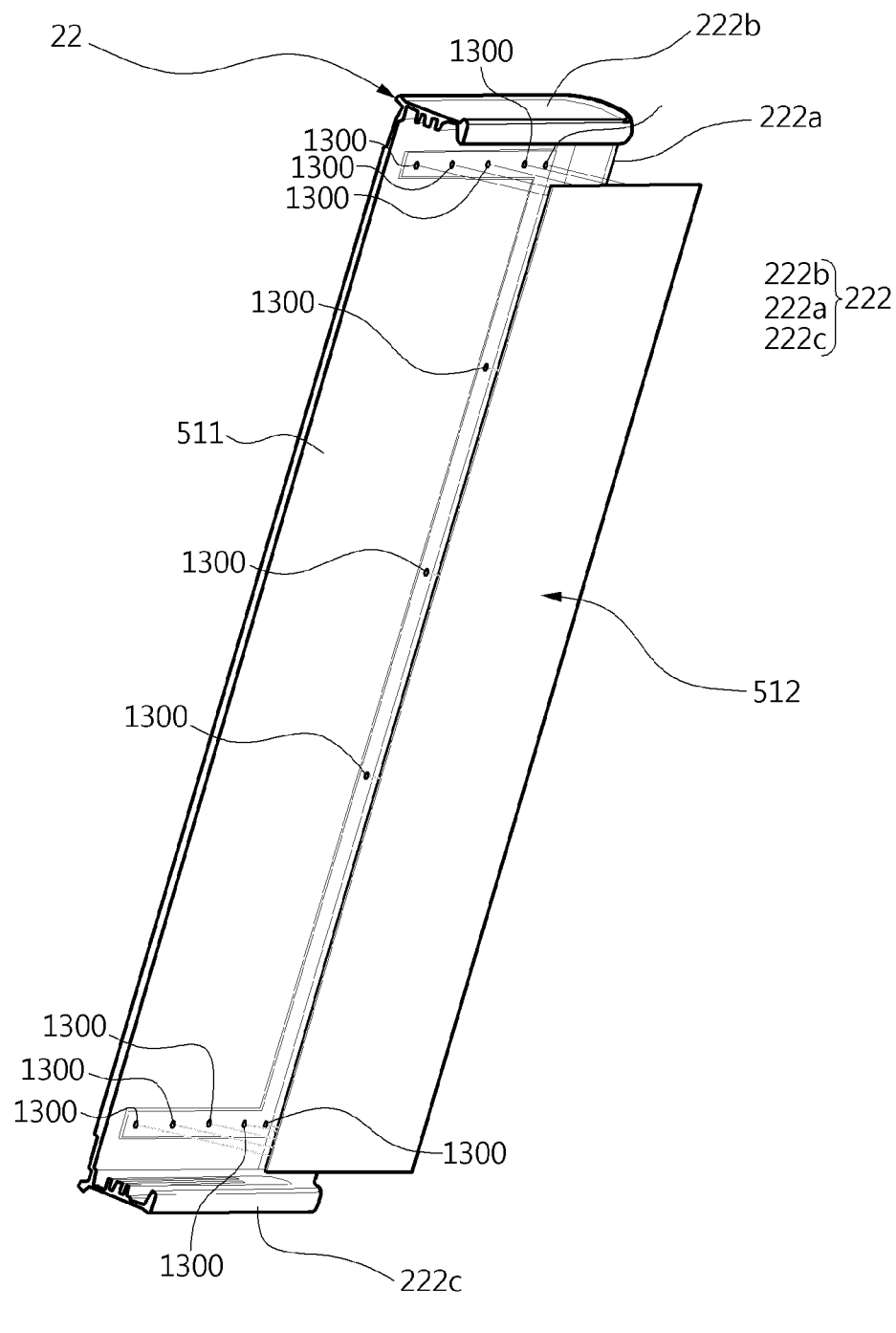
FIG. 13A illustrates a perspective view of a second housing and a second conductive portion according to an embodiment.
Figure 13B:
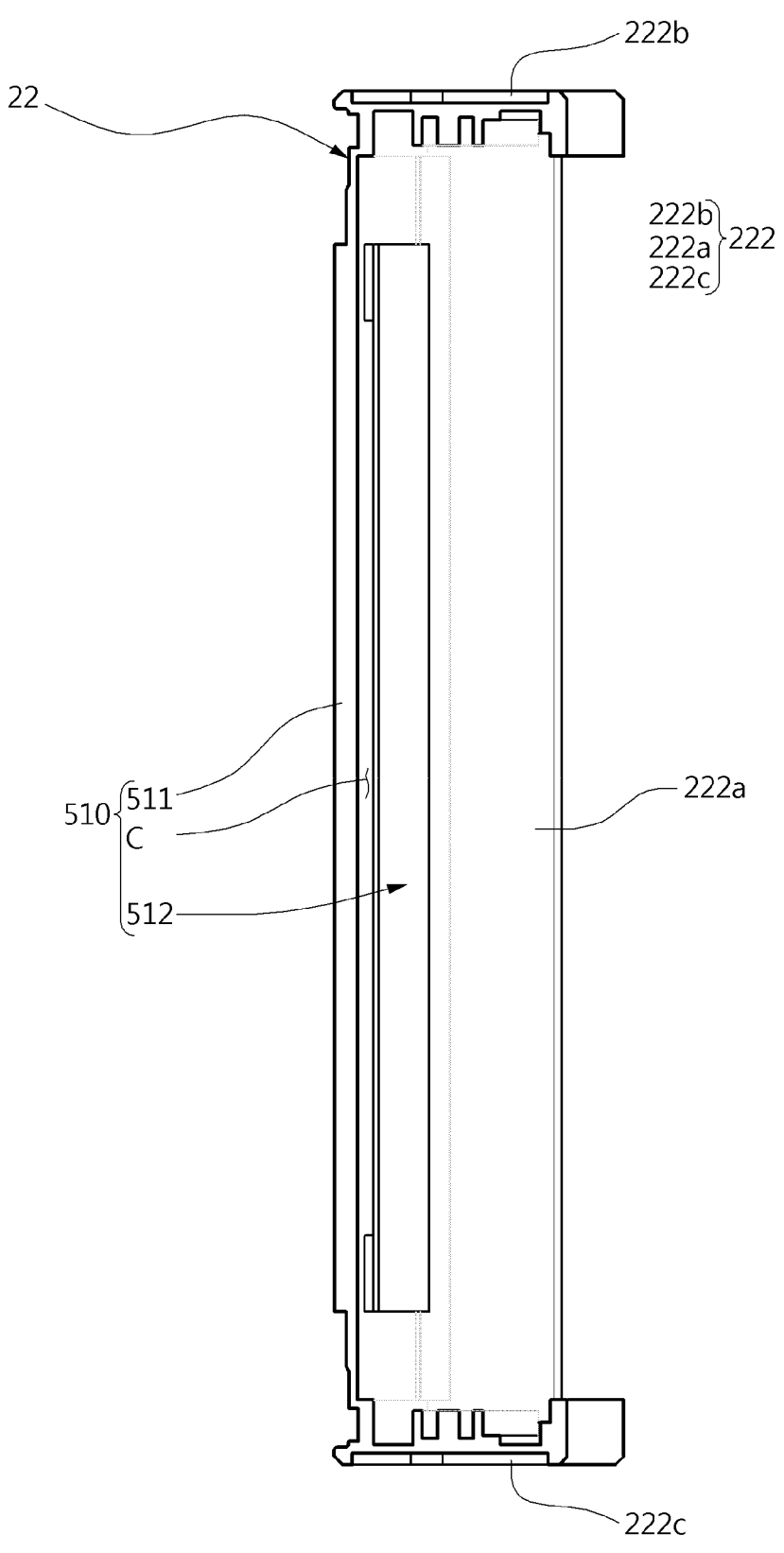
FIG. 13B illustrates a side view of a second housing and a second conductive portion according to an embodiment.

FIGS. 13A and 13B illustrate a second housing 22 and a second conductive portion 512 according to an embodiment.

In an embodiment, referring to FIGS. 13A and 13B, the second housing 22 may include the second side cover 222 and the first conductive portion 511. The second side cover 222 may include the first cover portion 222a, the second cover portion 222b, and/or the third cover portion 222c. According to an embodiment, the first conductive portion 511 and/or the second side cover 222 may be integrally formed.

In an embodiment, the second conductive portion 512 may be coupled to the first conductive portion 511. According to an embodiment, the second conductive portion 512 may be coupled and/or electrically connected to the first conductive portion 511 using ultrasonic bonding. According to another embodiment, the second conductive portion 512 may be coupled and/or electrically connected to the first conductive portion 511 by welding. According to an embodiment, the second conductive portion 512 may be coupled and/or electrically connected to the first conductive portion 511 using another fastening structure such as a screw. According to an embodiment, the second conductive portion 512 may be coupled and/or electrically connected to the first conductive portion 511 using a conductive adhesive member. Due to the coupling of the first conductive portion 511 and the second conductive portion 512, the cavity structure 510 including the cavity C may be formed.

Figure 13C:
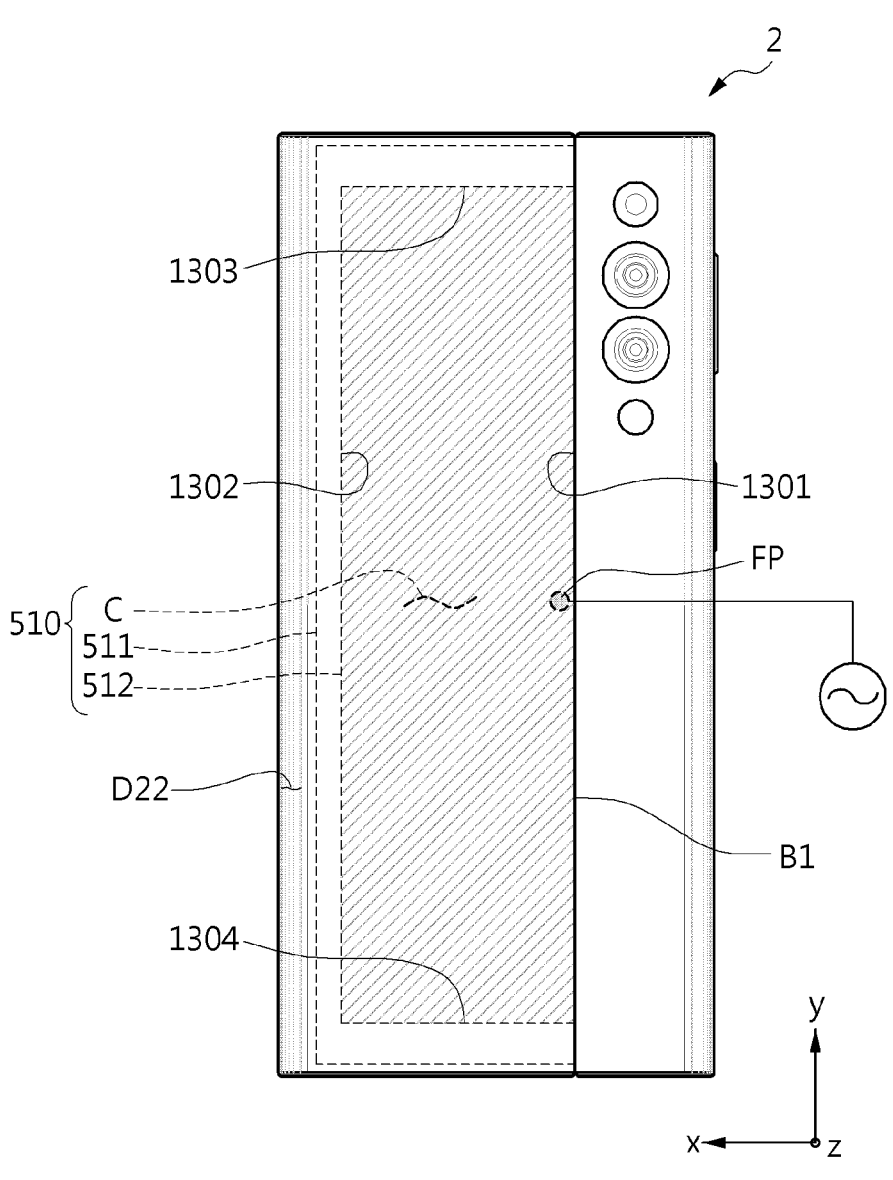
FIG. 13C is a rear view of an electronic device including a cavity in a closed state according to an embodiment.

FIG. 13C is a rear view of an electronic device 2 including a cavity C in a closed state according to an embodiment.

In an embodiment, referring to FIGS. 13A, 13B, and 13C, the cavity structure 510 may include the first conductive portion 511, the second conductive portion 512, and the cavity C between the first conductive portion 511 and the second conductive portion 512. In an embodiment, when viewed from the top of the rear surface of the electronic device 2, the cavity C may include a non-conductive boundary 1301, a first conductive boundary 1302, a second conductive boundary 1303, and/or a third conductive boundary 1304. The non-conductive boundary 1301 may include, for example, an edge corresponding to an opening of the cavity C where the conductive boundaries are not located. The non-conductive boundary 1301 may be located to correspond to the first boundary portion B1. The first conductive boundary 1302 may be located to be spaced apart from the non-conductive boundary 1301 in the +x-axis direction. The second conductive boundary 1303 and the third conductive boundary 1304 may be located to be spaced apart from each other in the y-axis direction. Mechanical and/or electrical connection portions 1300 between the first conductive portion 511 and the second conductive portion 512 may be formed using various methods such as ultrasonic bonding and/or welding and may be arranged and formed on the first conductive boundary 1302, the second conductive boundary 1303, and/or the third conductive boundary 1304. The mechanical and/or electrical connection portions 1300 between the first conductive portion 511 and the second conductive portion 512 may not be arranged on the non-conductive boundary 1301.

In an embodiment, the feeding point FP may be located on the first conductive portion 511 and/or the second conductive portion 512. The feeding point FP may be located, for example, adjacent to the non-conductive boundary 1301 to be closer to the non-conductive boundary 1301 than to the first conductive boundary 1302. In an embodiment, the feeding point FP may be adjacent to a substantial center of the non-conductive boundary 1301 in the y-axis direction to be located on the first conductive portion 511 and/or the second conductive portion 512. The position or number of the feeding points FPs may not be limited to the shown embodiment and may be various.

Figure 14:
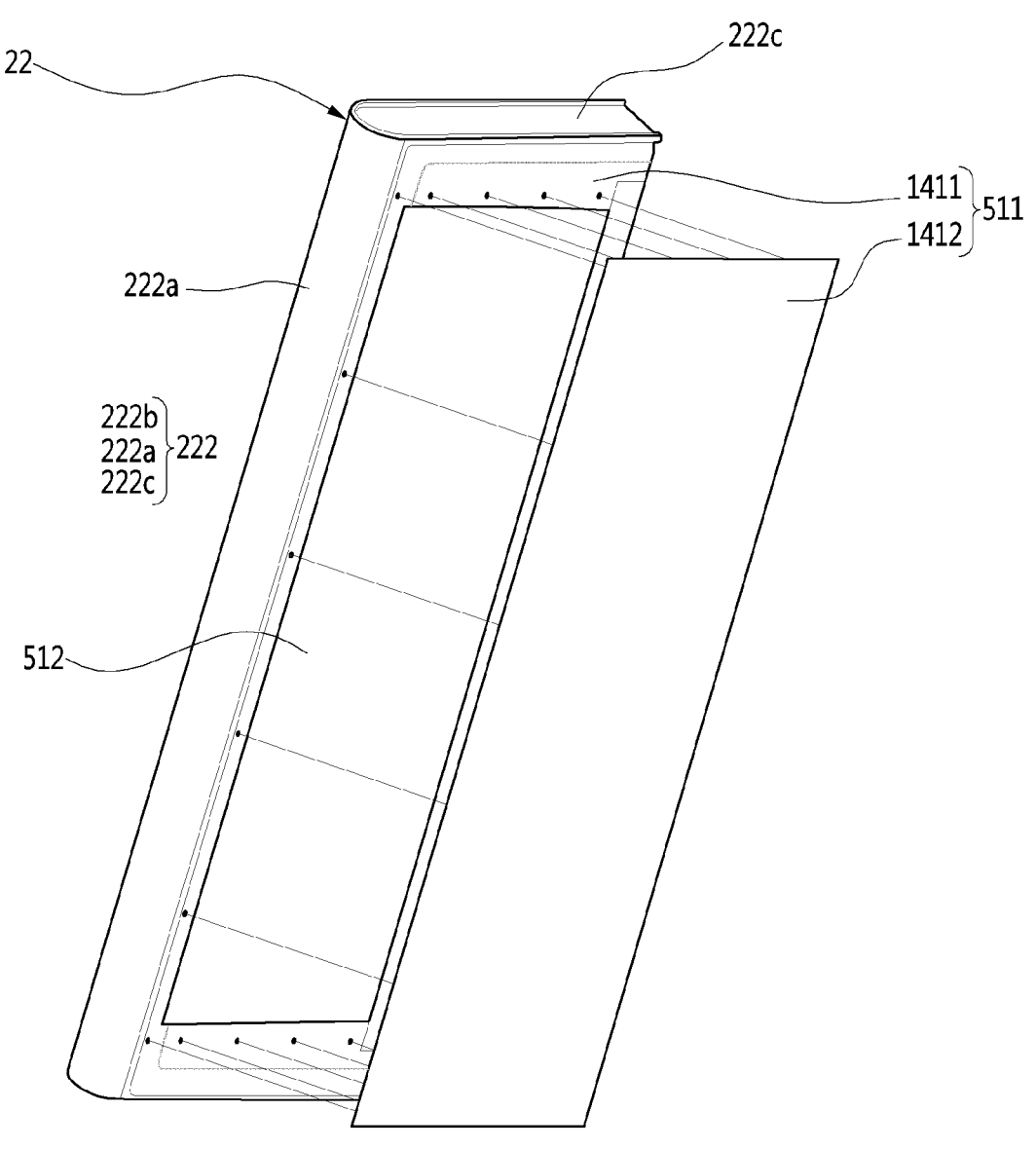
FIG. 14 illustrates a perspective view of a second housing and a second conductive portion according to another embodiment.

FIG. 14 illustrates a second housing 22 and a second conductive portion 512 according to another embodiment.

In an embodiment, referring to FIG. 14, the second housing 22 may include the second side cover 222 and the first conductive portion 511. The second side cover 222 may include the first cover portion 222a, the second cover portion 222b (see FIG. 2A, 2B, 3A, or 3B), and/or the third cover portion 222c. Referring to FIGS. 4 and 14, in an embodiment, the first conductive portion 511 may include a third conductive portion 1411 and a fourth conductive portion 1412. The third conductive portion 1411 and the second side cover 222 may be integrally formed with each other. The fourth conductive portion 1412 may be coupled to the third conductive portion 1411. According to an embodiment, the fourth conductive portion 1412 may be coupled and/or electrically connected to the third conductive portion 1411 using ultrasonic bonding. According to another embodiment, the fourth conductive portion 1412 may be coupled and/or electrically connected to the third conductive portion 1412 using welding. According to an embodiment, the fourth conductive portion 1412 may be coupled and/or electrically connected to the third conductive portion 1412 using other fastening structures such as screws. According to an embodiment, the fourth conductive portion 1412 may be coupled and/or electrically connected to the third conductive portion 1412 using a conductive adhesive member.

According to an embodiment, the second conductive portion 512 may be integrally formed with the second housing 22. According to another embodiment, as shown in the embodiment of FIG. 4, 5, 13A, or 13B, the second conductive portion 512 may be separately included to be coupled and/or electrically connected to the first conductive portion 511.

Figure 15A:
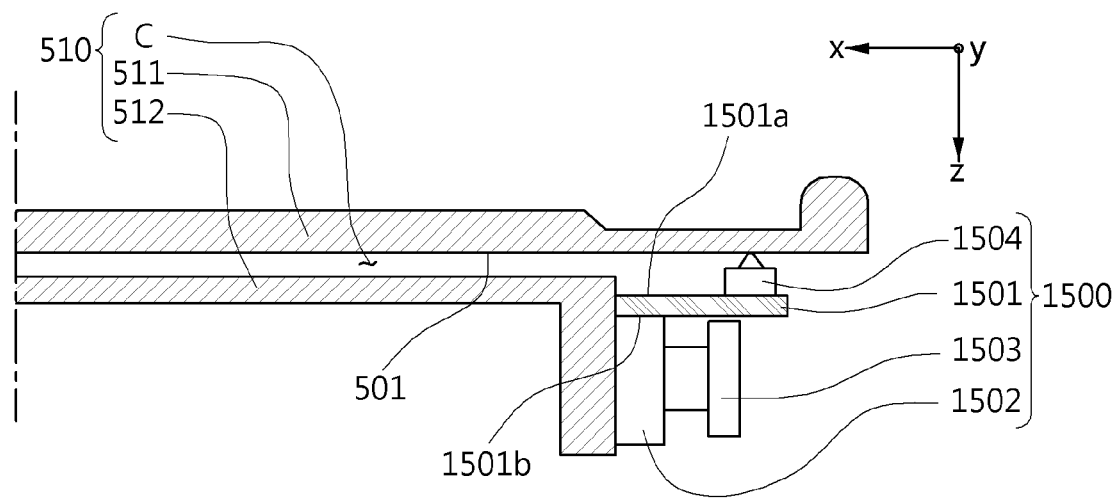
FIG. 15A is a cross-sectional view with respect to a cavity structure and a connection assembly according to an embodiment.
Figure 15B:
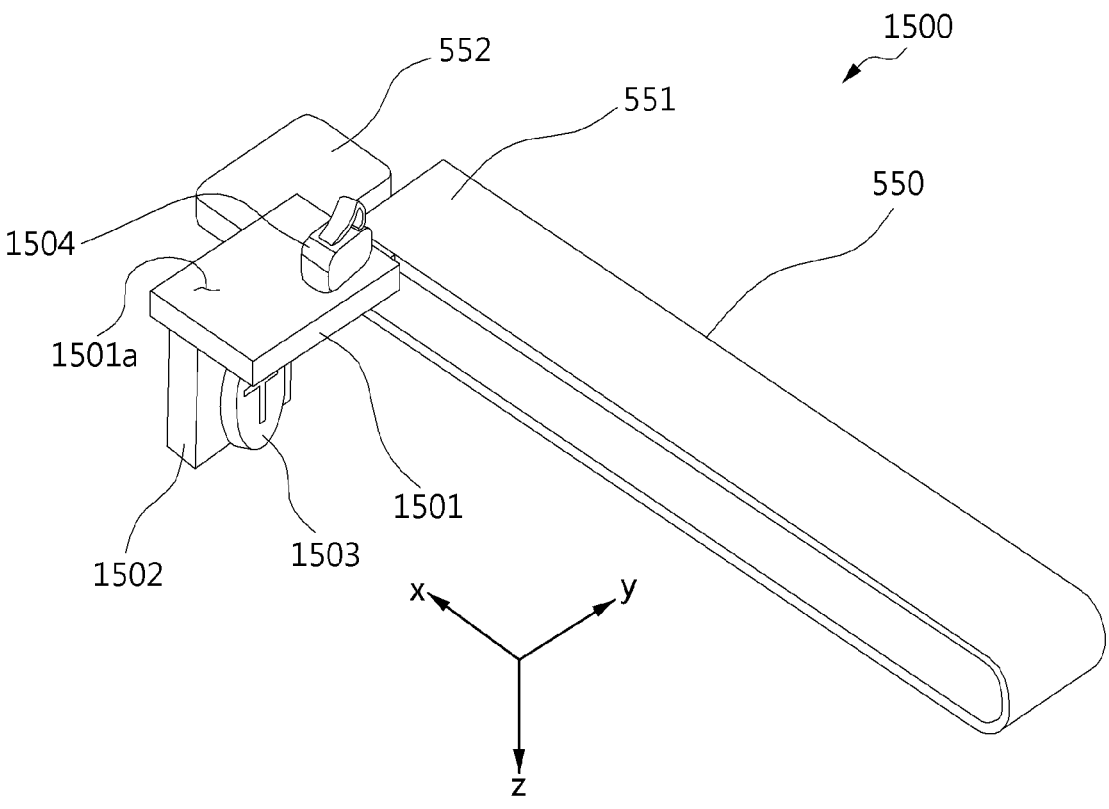
FIG. 15B illustrates a perspective view of the connection assembly of FIG. 15A according to an embodiment.

FIG. 15A is a cross-sectional view with respect to a cavity structure 510 and a connection assembly 1500 according to an embodiment. FIG. 15B illustrates the connection assembly 1500 of FIG. 15A according to an embodiment.

Referring to FIGS. 15A and 15B, in an embodiment, the connection assembly 1500 may include a printed circuit board 1501, a bolt fastening structure 1502, a bolt 1503, a flexible conductive member 1504, and/or a transmission line 550. The printed circuit board 1501 may include a fourth surface 1501a facing the second surface 502 of the first conductive portion 511 and/or a fifth surface 1501b facing a direction opposite to the fourth surface 1501a. In an embodiment, when viewed from the top of the first conductive portion 511 (e.g., when viewed in the +z-axis direction), the printed circuit board 1501 may not substantially overlap the second conductive portion 512. The flexible conductive member 1504 may be disposed on the fourth surface 1501a, and/or the bolt fastening structure 1502 may be disposed on the fifth surface 1501b. The bolt fastening structure 1502 and/or the second conductive portion 512 may be coupled using the bolt 1503. The flexible conductive member 1504 may electrically connect the first conductive portion 511 and the printed circuit board 1501 to each other between the first conductive portion 511 and the printed circuit board 1501. The flexible conductive member 1504 may include, for example, a C clip (e.g., a C-shaped spring), a pogo-pin, a spring, conductive PORON, conductive rubber, conductive tape, and/or a cooper connector. One end 551 of the transmission line 550 (e.g., a flexible printed circuit board) may be electrically connected to the printed circuit board 1501. The other end 552 of the transmission line 550 may be electrically connected to the wireless communication circuit 540 (see FIG. 4 or FIG. 5). A connector for electrically connecting to a printed circuit board (not shown) on which the processor 520, the memory 530, and/or the wireless communication circuit 540 of FIG. 4 are disposed may be disposed at the other end 552 of the transmission line 550. The first conductive portion 511 may be electrically connected to the wireless communication circuit 540 via the transmission line 550 and/or the printed circuit board 1501.

Figure 16A:
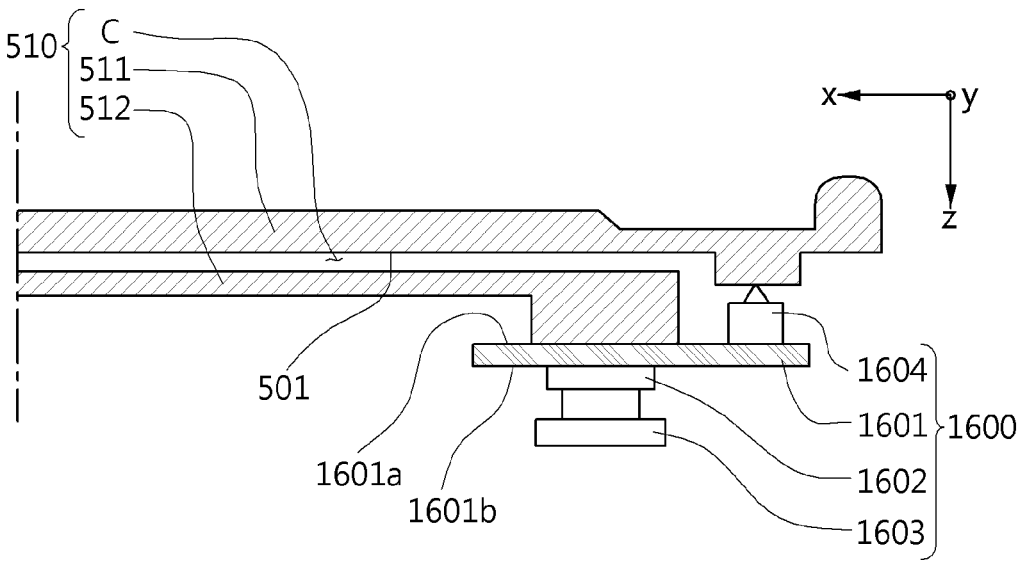
FIG. 16A is a cross-sectional view with respect to a cavity structure and a connection assembly according to another embodiment.
Figure 16B:
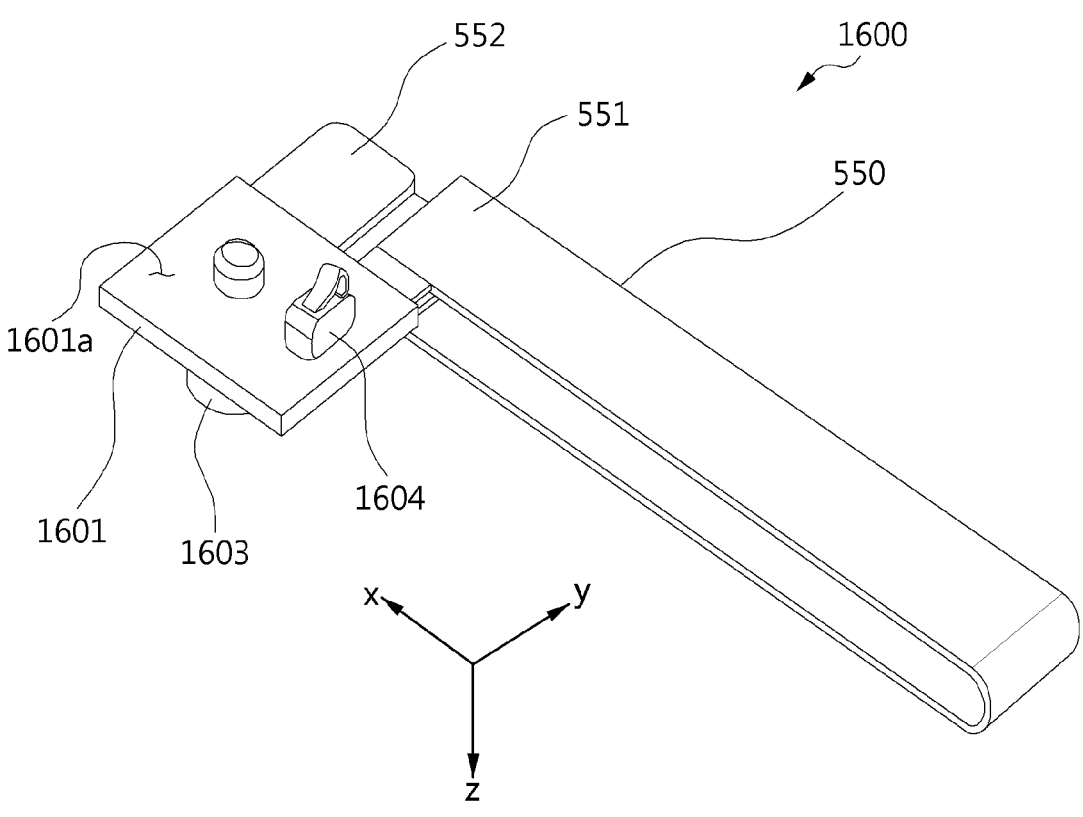
FIG. 16B illustrates a perspective view of the connection assembly of FIG. 16A according to another embodiment.

FIG. 16A is a cross-sectional view with respect to a cavity structure 510 and a connection assembly 1600 according to another embodiment. FIG. 16B illustrates the connection assembly 1600 of FIG. 16A according to another embodiment.

Referring to FIGS. 16A and 16B, in an embodiment, the connection assembly 1600 may include a printed circuit board 1601, a bolt fastening structure 1602, a bolt 1603, a flexible conductive member 1604, and/or a transmission line 550. The printed circuit board 1601 may include a fourth surface 1601*a* facing the second surface 502 of the first conductive portion 511 and/or a fifth surface 1601*b* facing a direction opposite to the fourth surface 1601*a*. The flexible conductive member 1604 (e.g., a C clip, a pogo pin, a spring, conductive PORON, conductive rubber, conductive tape, and/or a connector) may be disposed on the fourth surface 1601*a*, and/or the bolt fastening structure 1602 may be disposed on the fifth surface 1601*b*. A part of the second conductive portion 512 may be located between the first surface 501 of the first conductive portion 511 and the fourth surface 1601*a* of the printed circuit board 1601. The bolt fastening structure 1602 and the second conductive portion 512 may be coupled using the bolt 1603. The flexible conductive member 1604 may electrically connect the first conductive portion 511 and the printed circuit board 1601 to each other between the first conductive portion 511 and the printed circuit board 1601. One end 551 of the transmission line 550 (e.g., a flexible printed circuit board) may be electrically connected to the printed circuit board 1601. The other end 552 of the transmission line 550 may be electrically connected to the wireless communication circuit 540 (see FIG. 4 or FIG. 5). A connector configured to be electrically connected to a printed circuit board (not shown) on which the processor 520, the memory 530, and/or the wireless communication circuit 540 of FIG. 4 are arranged may be disposed on the other end 552 of the transmission line 550. The first conductive portion 511 may be electrically connected to the wireless communication circuit 540 via the transmission line 550 and/or the printed circuit board 1601.

Figure 17A:
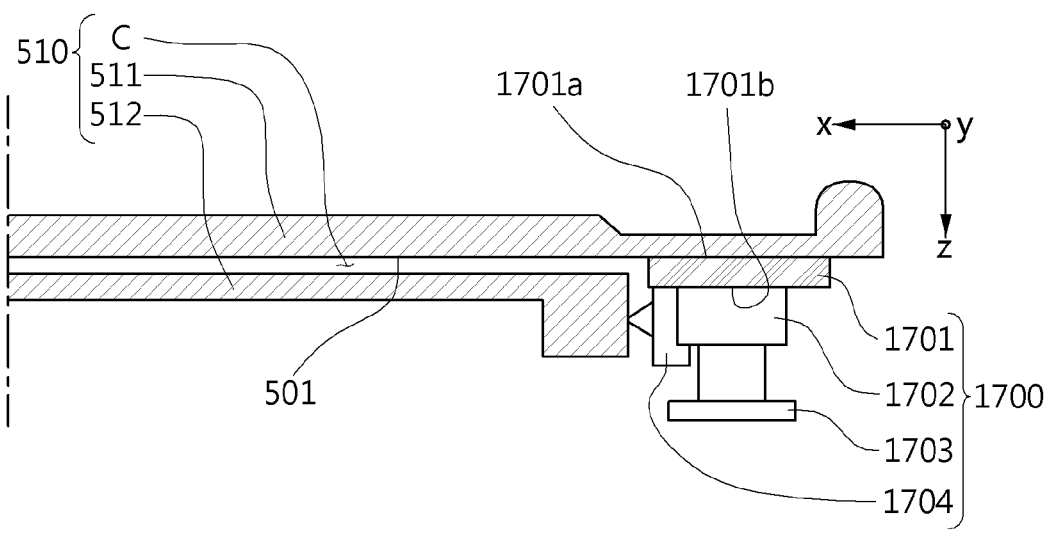
FIG. 17A is a cross-sectional view with respect to a cavity structure and a connection assembly according to still another embodiment.
Figure 17B:
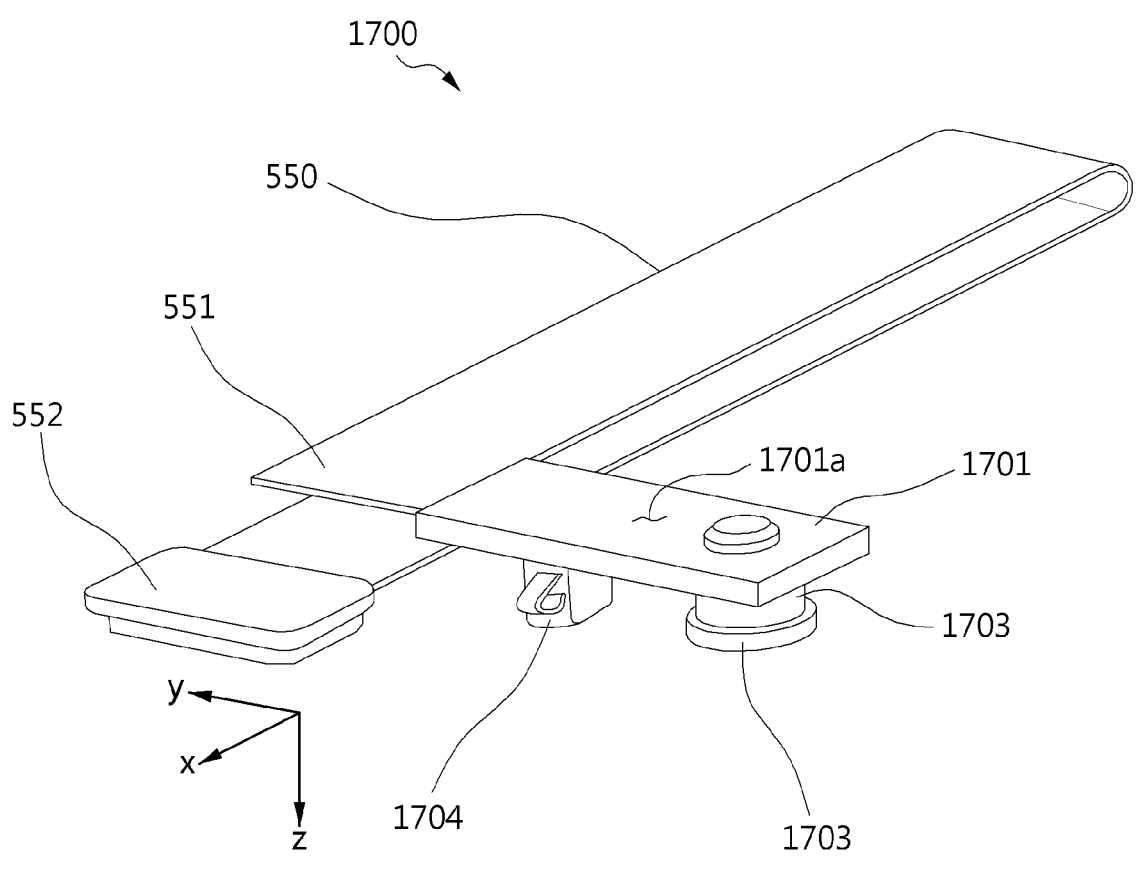
FIG. 17B illustrates a perspective view of the connection assembly of FIG. 17A according to still another embodiment.

FIG. 17A is a cross-sectional view with respect to a cavity structure 510 and a connection assembly 1700 according to still another embodiment. FIG. 17B illustrates the connection assembly 1700 of FIG. 17A according to still another embodiment.

Referring to FIGS. 17A and 17B, in an embodiment, the connection assembly 1700 may include a printed circuit board 1701, a bolt fastening structure 1702, a bolt 1703, a flexible conductive member 1704, and/or a transmission line 550. The printed circuit board 1701 may include a fourth surface 1701*a* facing the second surface 502 of the first conductive portion 511 and/or a fifth surface 1701*b* facing a direction opposite to the fourth surface 1701*a*. The flexible conductive member 1704 (e.g., a C-clip, a pogo pin, a spring, conductive PORON, conductive rubber, conductive tape, and/or a connector) and/or the bolt fastening structure 1702 may be arranged on the fifth surface 1701*b*. When viewed from the top of the first conductive portion 511 (e.g., when viewed in the +z-axis direction), the printed circuit board 1701 may not substantially overlap the second conductive portion 512. The bolt fastening structure 1702 and/or the printed circuit board 1701 may be coupled to the first conductive portion 511 using the bolt 1703. The flexible conductive member 1704 may electrically connect the second conductive portion 512 and the printed circuit board 1701 to each other. One end 551 of the transmission line 550 (e.g., a flexible printed circuit board) may be electrically connected to the printed circuit board 1701. The other end 552 of the transmission line 550 may be electrically connected to the wireless communication circuit 540 (see FIG. 4 or FIG. 5). A connector configured to be electrically connected to a printed circuit board (not shown) on which the processor 520, the memory 530, and/or the wireless communication circuit 540 of FIG. 4 are arranged may be disposed on the other end 552 of the transmission line 550. The second conductive portion 512 may be electrically connected to the wireless communication circuit 540 via the transmission line 550 and/or the printed circuit board 1701.

Figure 18A:
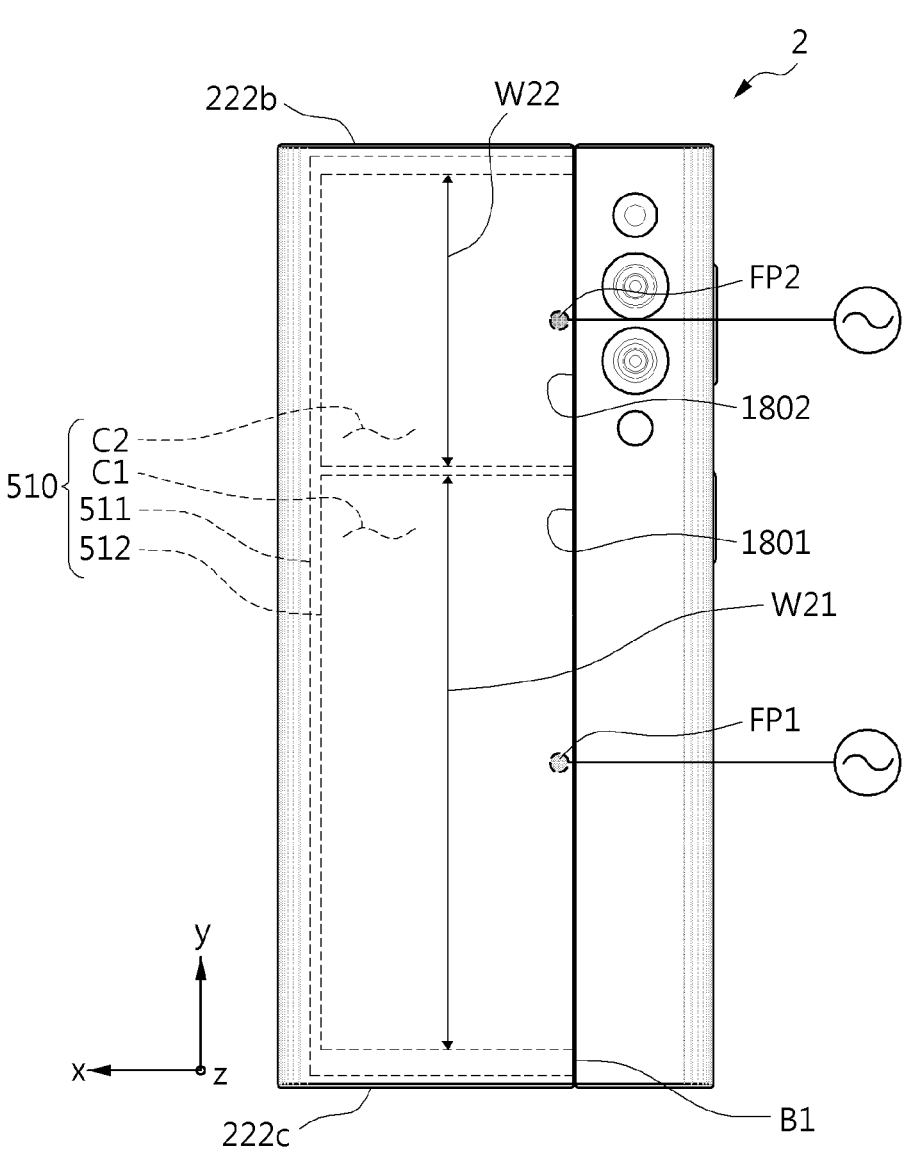
FIG. 18A is a rear view of an electronic device including a plurality of cavities in a closed state according to various embodiments.

FIG. 18A is a rear view of an electronic device 2 including a plurality of cavities in a closed state according to various embodiments.

Referring to FIG. 18A, in various embodiments, the cavity structure 510 may include a first conductive portion 511, a second conductive portion 512, and a first cavity C1 and/or a second cavity C2 between the first conductive portion 511 and the second conductive portion 512. When viewed from the top of the rear surface of the electronic device 2, the first cavity C1 may be located between the second cavity C2 and the third cover portion 222*c*. When viewed from the top of the rear surface of the electronic device 2, the second cavity C2 may be located between the first cavity C1 and the second cover portion 222*b*. The first cavity C1 may have a first width W21 in the y-axis direction, and the second cavity C2 may have a second width W22 in the y-axis direction. The first width W21 and the second width W22 may be different from each other. In an embodiment, the first width W21 and the second width W22 may be substantially the same. In an embodiment, the first cavity C1 and the second cavity C2 may have the same or different widths in the x-axis direction.

In an embodiment, the first cavity C1 and/or the second cavity C2 may be different only in width in the y-axis direction from, for example, the cavity C of FIG. 13C, and/or may be formed in substantially the same manner as the cavity C of FIG. 13C. The first cavity C1 may include, for example, a first non-conductive boundary 1801 located to correspond to the first boundary portion B1 and/or a plurality of conductive boundaries (not shown). The first non-conductive boundary 1801 may include, for example, an edge corresponding to an opening of the first cavity C1 in which a plurality of conductive boundaries are not located. For example, the second cavity C2 may include a second non-conductive boundary 1802 located in the first boundary portion B1, the second non-conductive boundary 1802, and/or a plurality of conductive boundaries. The second non-conductive boundary 1802 may include, for example, an edge corresponding to an opening of the second cavity C2 where the plurality of conductive boundaries are not located. In an embodiment, the first cavity C1 and the second cavity C2 may be electrically separated from each other.

According to an embodiment, a first feeding point FP1 may be located on the first conductive portion 511 and/or the second conductive portion 512 to correspond to the first cavity C1. The first feeding point FP1 may be located to be adjacent to the first non-conductive boundary 1801 corresponding to the first cavity C1, for example. In an embodiment, the first feeding point FP1 may be adjacent to a substantial center of the first non-conductive boundary 1801 in the y-axis direction to be located on the first conductive portion 511 and/or the second conductive portion 512.

According to an embodiment, a second feeding point FP2 may be located on the first conductive portion 511 and/or the second conductive portion 512 to correspond to the second cavity C2. The second feeding point FP2 may be located to be adjacent to the second non-conductive boundary 1802 corresponding to the second cavity C2, for example. In an embodiment, the second feeding point FP2 may be adjacent to a substantial center of the second non-conductive boundary 1802 in the y-axis direction to be located on the first conductive portion 511 and/or the second conductive portion 512.

In various embodiments, the position or number of the first feeding point FP1 and the second feeding point FP2 may not be limited to the shown embodiment and may be various.

Figure 18B:
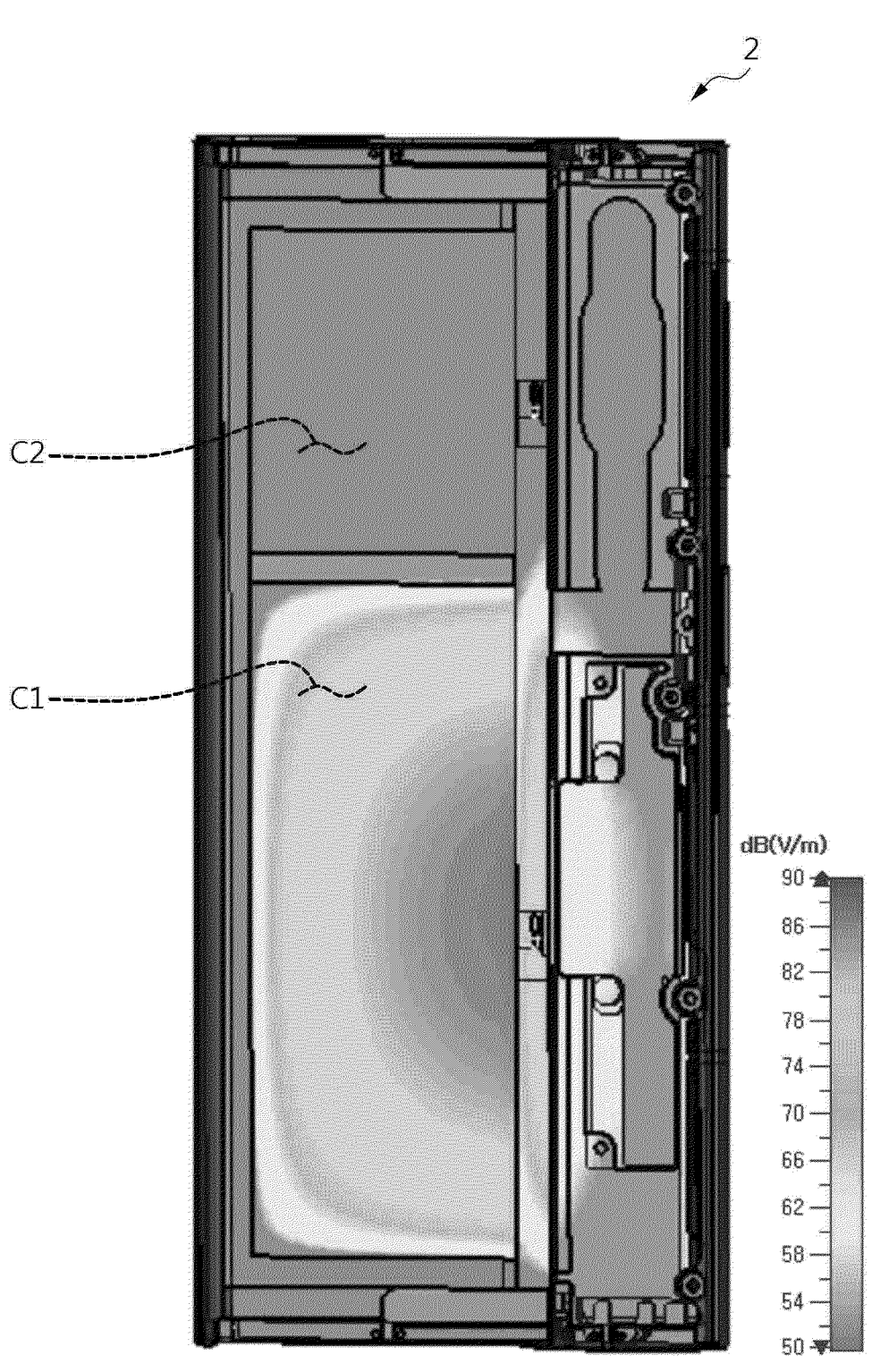
FIG. 18B illustrates a first electromagnetic field distribution when radiation current is provided to a first antenna utilizing a first cavity in the embodiment of FIG. 18A.
Figure 18C:
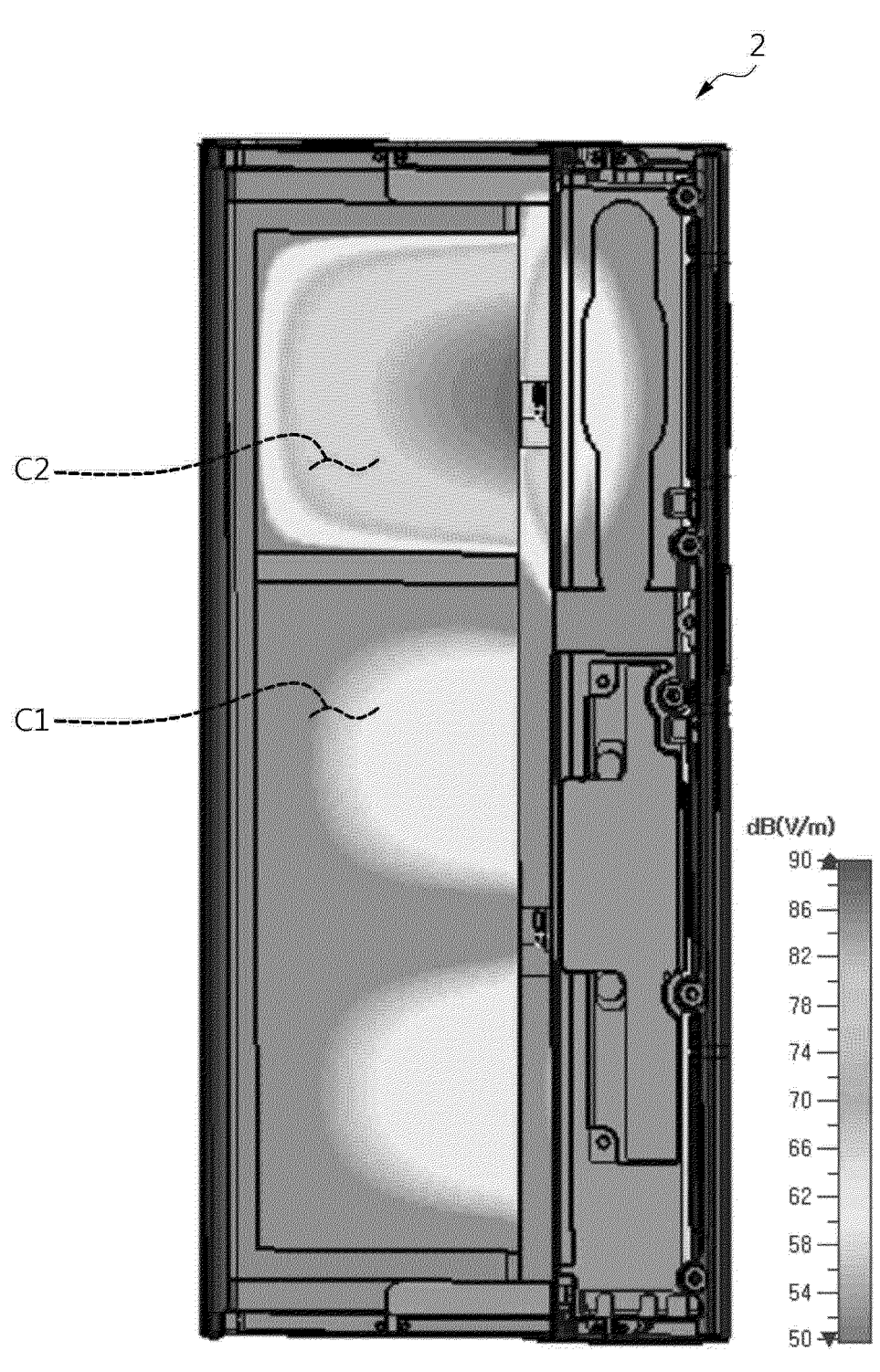
FIG. 18C illustrates a second electromagnetic field distribution when radiation current is provided to a second antenna utilizing a second cavity in the embodiment of FIG. 18A.
Figure 18D:
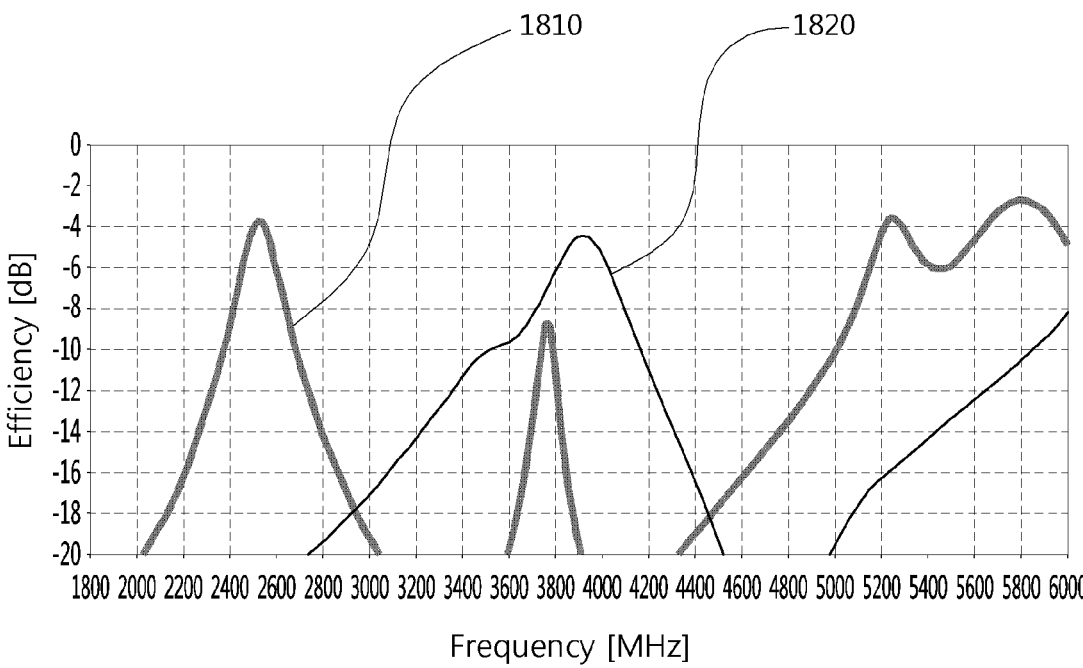
FIG. 18D is a graph showing antenna performance with respect to a first antenna utilizing a first cavity and antenna performance with respect to a second antenna utilizing a second cavity in the embodiment of FIG. 18A.

In an embodiment, FIG. 18B illustrates, for example, a first electromagnetic field distribution when radiation current is provided to the first antenna utilizing the first cavity C1 in the embodiment of FIG. 18A. FIG. 18C illustrates, for example, a second electromagnetic field distribution when radiation current is provided to a second antenna utilizing a second cavity C2 in the embodiment of FIG. 18A. FIG. 18D is a graph showing antenna performance with respect to a first antenna utilizing a first cavity C1 and antenna performance with respect to a second antenna utilizing a second cavity C2 in the embodiment of FIG. 18A.

In an embodiment, and referring to FIGS. 18A and 18D, reference numeral "1810" is a graph showing the performance of the first antenna utilizing the first cavity C1. Reference numeral "1820" is a graph showing the performance of the second antenna utilizing the second cavity C2. Referring to FIGS. 18A, 18B, 18C, and 18D, the first electromagnetic distribution with respect to the first antenna utilizing the first cavity C1 and the second electromagnetic distribution with respect to the second antenna utilizing the second cavity C2 may be different from each other. In relation to the electromagnetic distribution, frequency characteristics of the first antenna and frequency characteristics of the second antenna may be different from each other. The wireless communication circuit 540 (e.g., see FIG. 4 or FIG. 5) may be configured to transmit and/or receive signals of frequency bands different from each other via the first antenna and/or the second antenna. In an embodiment, the wireless communication circuit may be implemented to transmit and/or receive signals in at least a part of the same frequency bands via the first antenna and/or the second antenna. According to an embodiment, the wireless communication circuit 540 or the processor 520 (see FIG. 4 or FIG. 5) may be configured to selectively use the first antenna and/or the second antenna in a communication mode using a corresponding frequency band. The memory 530 (see FIG. 4 or FIG. 5) may store instructions configured to allow the processor 520 to selectively use at least one of the first antenna and the second antenna.

According to various embodiments, the number and/or positions of cavities may not be limited to the embodiment of FIG. 18A and may be included variously.

Figure 19:
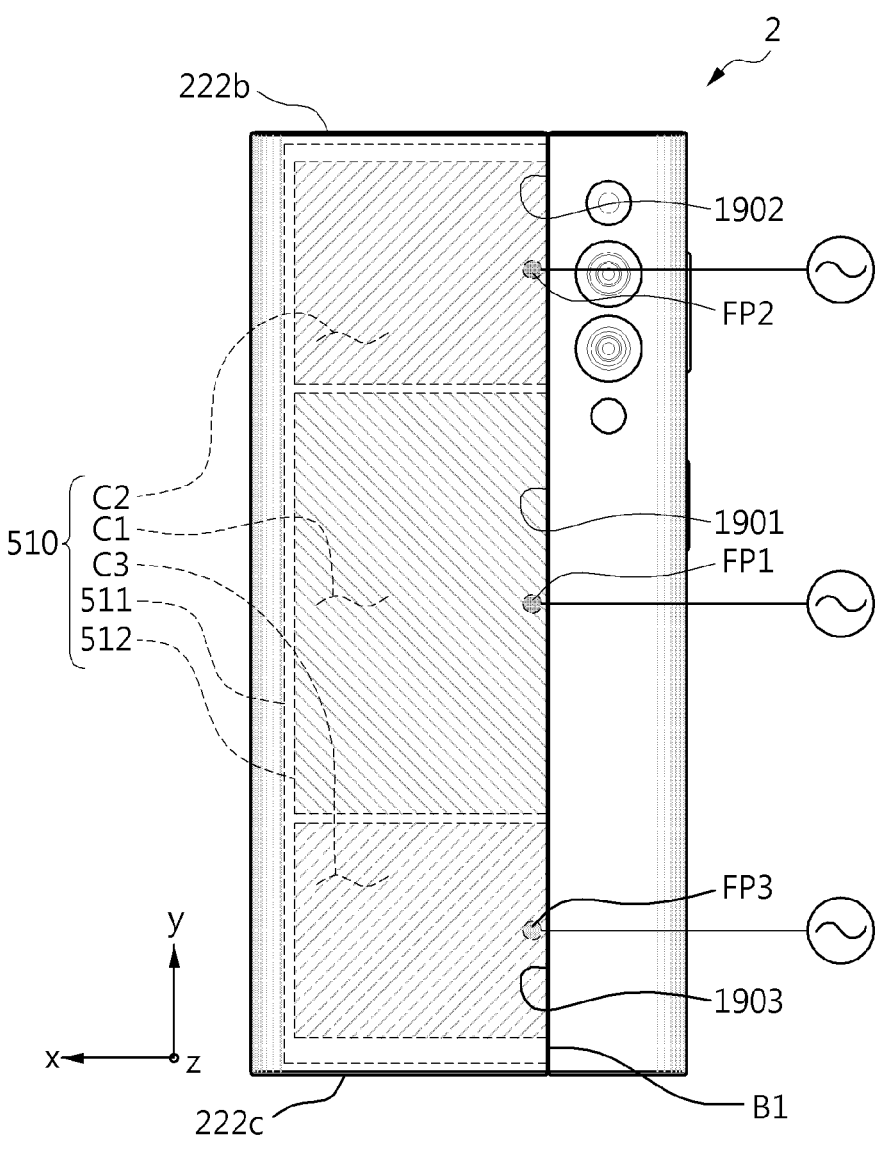
FIG. 19 is a rear view of an electronic device including a plurality of cavities in a closed state according to another embodiment.

FIG. 19 is a rear view of an electronic device 2 including a plurality of cavities in a closed state according to another embodiment.

In an embodiment, referring to FIG. 19, for example, a cavity structure 510 may include a first conductive portion 511, a second conductive portion 512, and a first cavity C1, a second cavity C2, and/or a third cavity C3 between the first conductive portion 511 and the second conductive portion 512. The first cavity C1 may be located between the second cavity C2 and the third cavity C3, when viewed from the top of the rear surface of the electronic device 2. The second cavity C2 may be located between the first cavity C1 and the second cover portion 222b, when viewed from the top of the rear surface of the electronic device 2. The third cavity C3 may be located between the first cavity C1 and the third cover portion 222c, when viewed from the top of the rear surface of the electronic device 2. Any two cavities among the first cavity C1, the second cavity C2, and/or the third cavity C3 may have widths the same as or different from each other in the y-axis direction. In various embodiments, any two cavities among the first cavity C1, the second cavity C2, and/or the third cavity C3 may have widths the same as and/or different from each other in the x-axis direction.

According to an embodiment, the first cavity C1, the second cavity C2, and/or the third cavity C3 may be different, for example, only in width in the y-axis direction from the cavity C of FIG. 13C, and/or may be formed in substantially the same manner as the cavity C of FIG. 13C. The first cavity C1 may include, for example, a first non-conductive boundary 1901 located to correspond to the first boundary portion B1 and/or a plurality of conductive boundaries (not shown). The first non-conductive boundary 1901 may include, for example, an edge corresponding to an opening of the first cavity C1 in which the plurality of conductive boundaries are not located. The second cavity C2 may include, for example, a second non-conductive boundary 1902 located to correspond to the first boundary portion B1 and/or a plurality of conductive boundaries (not shown). The second non-conductive boundary 1902 may include, for example, an edge corresponding to an opening of the second cavity C2 in which the plurality of conductive boundaries are not located. The third cavity C3 may include, for example, a third non-conductive boundary 1903 located to correspond to the first boundary portion B1 and/or a plurality of conductive boundaries (not shown). The third non-conductive boundary 1903 may include, for example, an edge corresponding to an opening of the third cavity C3 in which the plurality of conductive boundaries are not located.

In an embodiment, the first cavity C1, the second cavity C2, and/or the third cavity C3 may be electrically separated from each other.

According to an embodiment, the first feeding point FP1 may be located on the first conductive portion 511 and/or the second conductive portion 512 to correspond to the first cavity C1. The first feeding point FP1 may be located, for example, to be adjacent to the first non-conductive boundary 1901 corresponding to the first cavity C1. In an embodiment, the first feeding point FP1 may be adjacent to a substantial center of the first non-conductive boundary 1901 in the y-axis direction to be located on the first conductive portion 511 and/or the second conductive portion 512.

According to an embodiment, the second feeding point FP2 may be located on the first conductive portion 511 and/or the second conductive portion 512 to correspond to the second cavity C2. The second feeding point FP2 may be located, for example, to be adjacent to the second non-conductive boundary 1902 corresponding to the second cavity C2. In an embodiment, the second feeding point FP2 may be adjacent to a substantial center of the second non-conductive boundary 1902 in the y-axis direction to be located on the first conductive portion 511 and/or the second conductive portion 512.

According to an embodiment, a third feeding point FP3 may be located on the first conductive portion 511 and/or the second conductive portion 512 to correspond to the third cavity C3. The third feeding point FP3 may be located, for example, to be adjacent to the third non-conductive boundary 1903 corresponding to the third cavity C3. In an embodiment, the third feeding point FP3 may be adjacent to a substantial center of the third non-conductive boundary 1903 in the y-axis direction to be located on the first conductive portion 511 and/or the second conductive portion 512.

In various embodiments, the position or number of the first feeding point FP1, the second feeding point FP2, and/or the third feeding point FP3 may not be limited to the shown embodiment, and may be various.

According to an embodiment, the wireless communication circuit 540 (e.g., see FIG. 4 or FIG. 5) may be configured to transmit and/or receive signals of at least one frequency band via the first antenna utilizing the first cavity C1, the second antenna utilizing the second cavity C2, and/or a third antenna utilizing the third cavity C3.

Figure 20:
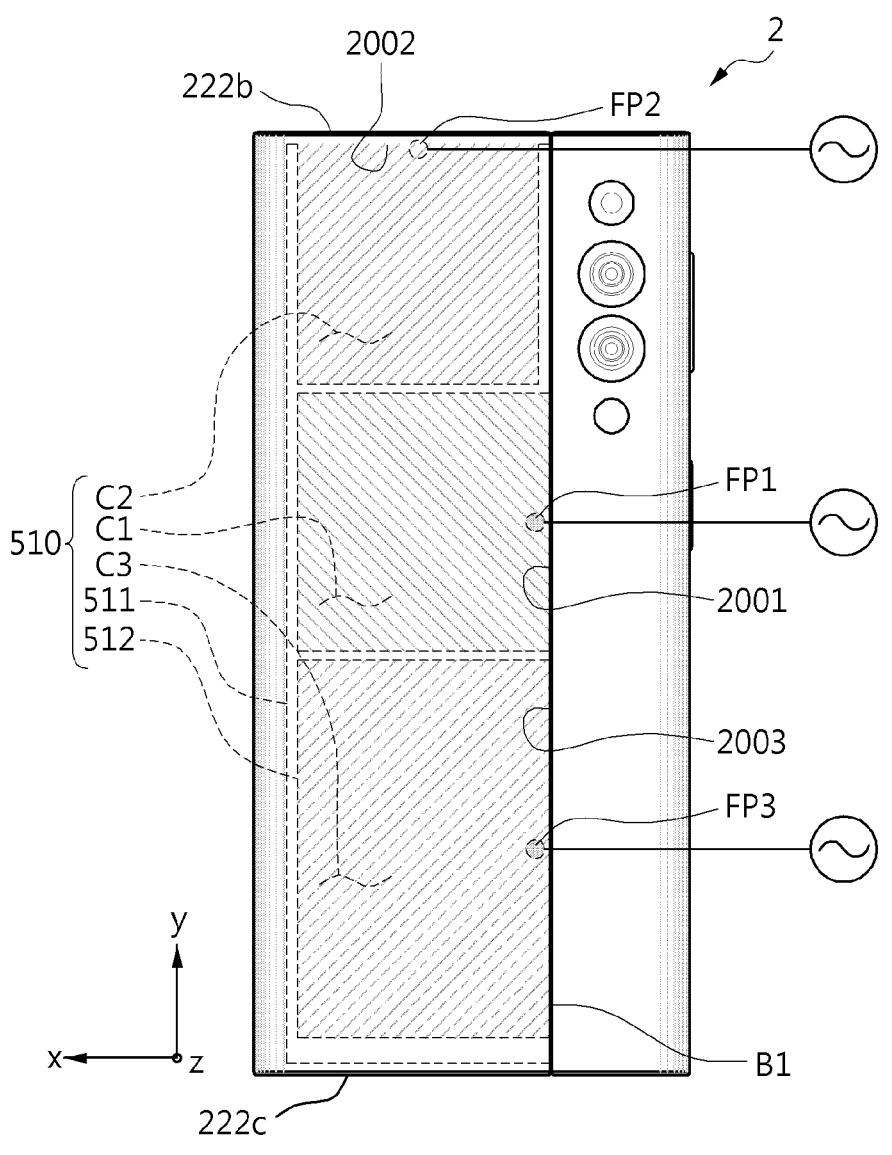
FIG. 20 is a rear view of an electronic device including a plurality of cavities in a closed state according to still another embodiment.

FIG. 20 is a rear view of an electronic device 2 including a plurality of cavities in a closed state according to still another embodiment.

In an embodiment, referring to FIG. 20, a cavity structure 510 may include, for example, a first conductive portion 511, a second conductive portion 512, and/or a first cavity C1, a second cavity C2, and/or a third cavity C3 between the first conductive portion 511 and the second conductive portion 512. The first cavity C1 may be located between the second cavity C2 and the third cavity C3, when viewed from the top of the rear surface of the electronic device 2. The second cavity C2 may be located between the first cavity C1 and the second cover portion 222*b*, when viewed from the top of the rear surface of the electronic device 2. The third cavity C3 may be located between the first cavity C1 and the third cover portion 222*c*, when viewed from the top of the rear surface of the electronic device 2. According to an embodiment, any two cavities among the first cavity C1, the second cavity C2, and/or the third cavity C3 may have widths the same as or different from each other in the y-axis direction. In various embodiments, any two cavities among the first cavity C1, the second cavity C2, and/or the third cavity C3 may have widths the same as and/or different from each other in the x-axis direction.

According to an embodiment, the first cavity C1 and/or the third cavity C3 may be different, for example, only in width in the y-axis direction from the cavity C of FIG. 13C, and/or may be formed in substantially the same manner as the cavity C of FIG. 13C. The first cavity C1 may include, for example, a first non-conductive boundary 2001 located to correspond to the first boundary portion B1 and/or a plurality of conductive boundaries (not shown). The first non-conductive boundary 2001 may include, for example, an edge corresponding to an opening of the first cavity C1 in which the plurality of conductive boundaries are not located. The third cavity C3 may include, for example, a third non-conductive boundary 2003 located to correspond to the first boundary portion B1 and/or a plurality of conductive boundaries (not shown). The third non-conductive boundary 2003 may include, for example, an edge corresponding to an opening of the third cavity C3 in which the plurality of conductive boundaries are not located.

According to an embodiment, the second cavity C2 may include a second non-conductive boundary 2002 located to correspond to the second cover portion 222*b* and/or a plurality of conductive boundaries (not shown). The second non-conductive boundary 2002 may include, for example, an edge corresponding to an opening of the second cavity C2 in which the plurality of conductive boundaries are not located.

In an embodiment, the first cavity C1, the second cavity C2, and/or the third cavity C3 may be electrically separated from each other.

According to an embodiment, the first feeding point FP1 may be located on the first conductive portion 511 and/or the second conductive portion 512 to correspond to the first cavity C1. The first feeding point FP1 may be located, for example, to be adjacent to the first non-conductive boundary 2001 corresponding to the first cavity C1. In an embodiment, the first feeding point FP1 may be adjacent to a substantial center of the first non-conductive boundary 2001 in the y-axis direction to be located on the first conductive portion 511 and/or the second conductive portion 512.

According to an embodiment, the second feeding point FP2 may be located on the first conductive portion 511 and/or the second conductive portion 512 to correspond to the second cavity C2. The second feeding point FP2 may be located, for example, to be adjacent to the second non-conductive boundary 2002 corresponding to the second cavity C2. In an embodiment, the second feeding point FP2 may be adjacent to a substantial center of the second non-conductive boundary 2002 in the y-axis direction to be located on the first conductive portion 511 and/or the second conductive portion 512.

According to an embodiment, the third feeding point FP3 may be located on the first conductive portion 511 and/or the second conductive portion 512 to correspond to the third cavity C3. The third feeding point FP3 may be located, for example, to be adjacent to the third non-conductive boundary 2003 corresponding to the third cavity C3. In an embodiment, the third feeding point FP3 may be adjacent to a substantial center of the third non-conductive boundary 2003 in the y-axis direction to be located on the first conductive portion 511 and/or the second conductive portion 512.

In various embodiments, the position and/or number of the first feeding point FP1, the second feeding point FP2, and/or the third feeding point FP3 may not be limited to the shown embodiment, and may be various.

According to an embodiment, the wireless communication circuit 540 (e.g., see FIG. 4 or FIG. 5) may be configured to transmit and/or receive signals of at least one frequency band via the first antenna utilizing the first cavity C1, the second antenna utilizing the second cavity C2, and/or the third antenna utilizing the third cavity C3.

Figure 21:
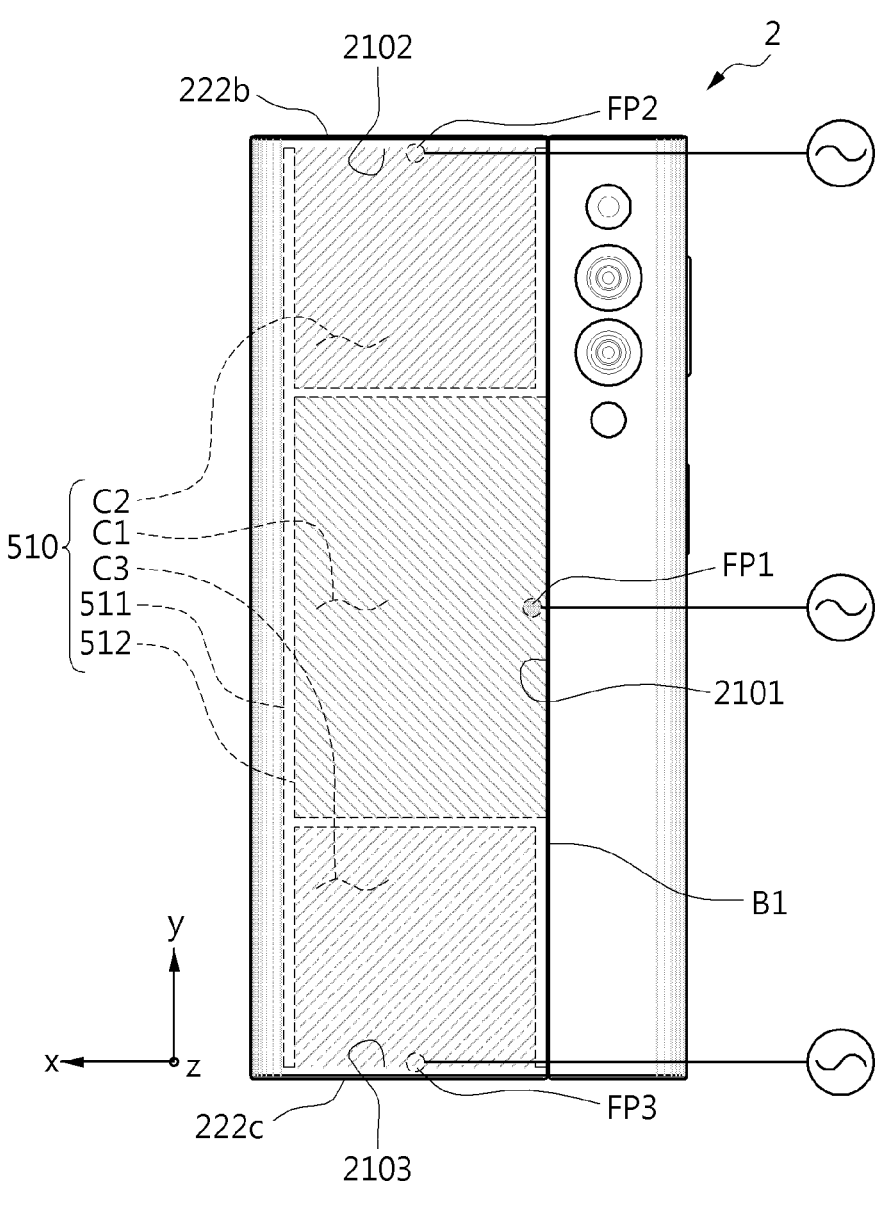
FIG. 21 is a rear view of an electronic device including a plurality of cavities in a closed state according to still yet another embodiment.

FIG. 21 is a rear view of an electronic device 2 including a plurality of cavities in a closed state according to still another embodiment.

In an embodiment, referring to FIG. 21, for example, a cavity structure 510 may include a first conductive portion

511, a second conductive portion 512, and/or a first cavity C1, a second cavity C2, and/or a third cavity C3 between the first conductive portion 511 and the second conductive portion 512. The first cavity C1 may be located between the second cavity C2 and the third cavity C3, when viewed from the top of the rear surface of the electronic device 2. The second cavity C2 may be located between the first cavity C1 and the second cover portion 222*b*, when viewed from the top of the rear surface of the electronic device 2. The third cavity C3 may be located between the first cavity C1 and the third cover portion 222*c*, when viewed from the top of the rear surface of the electronic device 2. According to an embodiment, any two cavities among the first cavity C1, the second cavity C2, and/or the third cavity C3 may have widths the same as and/or different from each other in the y-axis direction. In various embodiments, any two cavities among the first cavity C1, the second cavity C2, and/or the third cavity C3 may have widths the same as and/or different from each other in the x-axis direction.

According to an embodiment, the first cavity C1 may be different, for example, only in width in the y-axis direction from the cavity C of FIG. 13C, and/or may be formed in substantially the same manner as the cavity C of FIG. 13C. The first cavity C1 may include, for example, a first non-conductive boundary 2101 located to correspond to the first boundary portion B1 and a plurality of conductive boundaries (not shown). The first non-conductive boundary 2101 may include, for example, an edge corresponding to an opening of the first cavity C1 in which the plurality of conductive boundaries are not located.

According to an embodiment, the second cavity C2 may include a second non-conductive boundary 2102 located to correspond to the second cover portion 222*b* and/or a plurality of conductive boundaries (not shown). The second non-conductive boundary 2102 may include, for example, an edge corresponding to an opening of the second cavity C2 in which the plurality of conductive boundaries are not located.

According to an embodiment, the third cavity C3 may include a third non-conductive boundary 2103 located to correspond to the third cover portion 222*c* and/or a plurality of conductive boundaries (not shown). The third non-conductive boundary 2103 may include, for example, an edge corresponding to an opening of the third cavity C3 in which the plurality of conductive boundaries are not located.

According to an embodiment, the first cavity C1, the second cavity C2, and/or the third cavity C3 may be electrically separated from each other.

According to an embodiment, the first feeding point FP1 may be located on the first conductive portion 511 and/or the second conductive portion 512 to correspond to the first cavity C1. The first feeding point FP1 may be located, for example, to be adjacent to the first non-conductive boundary 2101 corresponding to the first cavity C1. In an embodiment, the first feeding point FP1 may be located adjacent to a substantial center of the first non-conductive boundary 2101 in the y-axis direction to be located on the first conductive portion 511 and/or the second conductive portion 512.

According to an embodiment, the second feeding point FP2 may be located on the first conductive portion 511 and/or the second conductive portion 512 to correspond to the second cavity C2. The second feeding point FP2 may be located, for example, to be adjacent to the second non-conductive boundary 2102 corresponding to the second cavity C2. In an embodiment, the second feeding point FP2 may be located adjacent to a substantial center of the second non-conductive boundary 2102 in the x-axis direction to be located on the first conductive portion 511 and/or the second conductive portion 512.

According to an embodiment, the third feeding point FP3 may be located on the first conductive portion 511 and/or the second conductive portion 512 to correspond to the third cavity C3. The third feeding point FP3 may be located, for example, to be adjacent to the third non-conductive boundary 2103 corresponding to the third cavity C3. In an embodiment, the third feeding point FP3 may be located adjacent to a substantial center of the third non-conductive boundary 2103 in the x-axis direction to be located on the first conductive portion 511 and/or the second conductive portion 512.

In various embodiments, the position and/or number of the first feeding point 1FP, the second feeding point FP2, and/or the third feeding point FP3 may not be limited to the shown embodiment, and may be various.

According to an embodiment, the wireless communication circuit 540 (e.g., see FIG. 4 or FIG. 5) may be configured to transmit and/or receive signals of at least one frequency band via the first antenna utilizing the first cavity C1, the second antenna utilizing the second cavity C2, and/or the third antenna utilizing the third cavity C3.

According to an embodiment, an electronic device (e.g., the electronic device 2 of FIG. 4 or FIG. 5) may include a housing (e.g., the housing 20 of FIG. 2A). The housing 20 may include a first housing (e.g., the first housing 21 of FIG. 4 or FIG. 5) and a second housing (e.g., the second housing 22 of FIG. 4 or FIG. 5) slidable with respect to the first housing. The electronic device may include a flexible display (e.g., the flexible display 30 of FIG. 4 or FIG. 5) disposed to be supported by the housing. The flexible display may include a first area (e.g., the first area ① of FIG. 4 or FIG. 5) exposed to the outside of the electronic device. The flexible display may include a second area (e.g., the second area ② of FIG. 4 or FIG. 5). The second area may be extended from the first area, and/or be drawn out of and/or into the housing by the sliding of the second housing. The electronic device may include a cavity structure (e.g., the cavity structure 510 of FIG. 4 or FIG. 5) located in the second housing. The electronic device may include a wireless communication circuit (e.g., the wireless communication circuit 540 of FIG. 4 or FIG. 5) configured to transmit and/or receive signals of a selected and/or designated frequency band via the cavity structure.

According to an embodiment, the cavity structure (e.g., the cavity structure 510 of FIG. 4 or FIG. 5) may include a first conductive portion (e.g., the first conductive portion 511 of FIG. 4 or FIG. 5) and/or a second conductive portion (e.g., the second conductive portion 512 of FIG. 4 or FIG. 5). The first conductive portion and the second conductive portion may at least partially overlap each other, when viewed from the top of a screen (e.g., the screen S of FIG. 4 or FIG. 5) of the electronic device. The first conductive portion and the second conductive portion may be electrically connected to each other. The cavity structure may include a cavity (e.g., the cavity C of FIG. 4 or FIG. 5) between the first conductive portion and the second conductive portion.

According to an embodiment, the cavity (e.g., the cavity C of FIG. 4 or FIG. 5) may include conductive boundaries (e.g., the first conductive boundary 1302, the second conductive boundary 1303, and/or the third conductive boundary 1304 of FIG. 13C) on which connection portions (e.g., the connection portions 1300 of FIG. 13A) for electrically connecting the first conductive portion and/or the second conductive portion are located between the first conductive portion (e.g., the first conductive portion 511 of FIG. 4 or FIG. 5) and the second conductive portion (e.g., the second conductive portion 512 of FIG. 4 or FIG. 5). The cavity may include a non-conductive boundary (e.g., the non-conductive boundary 1301 of FIG. 13C) on which the connection portions are not located between the first conductive portion and the second conductive portion.

According to an embodiment, the connection portions (e.g., the connection portions 1300 of FIG. 13A) may be formed using ultrasonic bonding or welding.

According to an embodiment, the wireless communication circuit (e.g., the wireless communication circuit 540 of FIG. 4 or FIG. 5) may be electrically connected to the cavity structure (e.g., the cavity structure 510 of FIG. 4 or FIG. 5) at a position adjacent to the non-conductive boundary (e.g., the non-conductive boundary 1301 of FIG. 13C).

According to an embodiment, the wireless communication circuit (e.g., the wireless communication circuit 540 of FIG. 4 or FIG. 5) may be located adjacent to a center of the non-conductive boundary (e.g., the non-conductive boundary 1301 of FIG. 13C) to be electrically connected to the cavity structure (e.g., the cavity structure 510 of FIG. 4 or FIG. 5).

According to an embodiment, the second conductive portion (e.g., the second conductive portion 512 of FIG. 4 or FIG. 5) may be coupled to the first conductive portion between the first conductive portion (e.g., the first conductive portion 511 of FIG. 4 or FIG. 5) and the screen (e.g., the screen S of FIG. 4 or FIG. 5).

According to an embodiment, the wireless communication circuit (e.g., the wireless communication circuit 540 of FIG. 4 or FIG. 5) may be electrically connected to the first conductive portion (e.g., the first conductive portion 511 of FIG. 4 or FIG. 5).

According to an embodiment, the wireless communication circuit (e.g., the wireless communication circuit 540 of FIG. 4 or FIG. 5) may be electrically connected to the second conductive portion (e.g., the second conductive portion 512 of FIG. 4 or FIG. 5).

According to an embodiment, the first conductive portion (e.g., the first conductive portion 511 of FIG. 13A) may be integrally formed with the second housing (e.g., the second housing 22 of FIG. 13A).

According to an embodiment, the second conductive portion (e.g., the second conductive portion 512 of FIG. 14) may be integrally formed with the second housing (e.g., the second housing 22 of FIG. 14).

According to an embodiment, the first conductive portion (e.g., the first conductive portion 511 of FIG. 14) may include a plurality of conductive portions (e.g., the third conductive portion 1411 and the fourth conductive portion 1412 of FIG. 14).

According to an embodiment, at least a part of the second conductive portion (e.g., the second conductive portion 512 of FIG. 4 or FIG. 5) may be located between the second area and the first conductive portion (e.g., the first conductive portion 511 of FIG. 4 or FIG. 5), when the second area (e.g., the second area ② of FIG. 4 or FIG. 5) is drawn into the housing (e.g., the housing 20 of FIG. 2A).

According to an embodiment, the cavity structure (e.g., the cavity structure 510 of FIG. 18A) may include a first cavity (e.g., the first cavity C1 of FIG. 18A) and/or a second cavity (e.g., the second cavity C2 of FIG. 18A).

According to an embodiment, the wireless communication circuit (e.g., the wireless communication circuit 540 of FIG. 4 or FIG. 5) may be electrically connected to the cavity structure (e.g., the cavity structure 510 of FIG. 18A) to correspond to the first cavity (e.g., the first cavity C1 of FIG. 18A). In an embodiment, the wireless communication circuit may be electrically connected to the cavity structure to correspond to the second cavity (e.g., the second cavity C2 of FIG. 18A).

According to an embodiment, the cavity (e.g., the cavity C of FIG. 4 or FIG. 5) may have a height of about 0.1 mm to about 1 mm or less.

According to an embodiment, an electronic device (e.g., the electronic device of FIG. 4 or FIG. 5) may include a housing (e.g., the housing 20 of FIG. 2A). The housing 20 may include a first housing (e.g., the first housing 21 of FIG. 4 or FIG. 5) and a second housing (e.g., the second housing 22 of FIG. 4 or FIG. 5) slidable with respect to the first housing. The electronic device may include a flexible display (e.g., the flexible display of FIG. 4 or FIG. 5) disposed to be supported by the housing. The flexible display may include a first area (e.g., the first area ① of FIG. 4 or FIG. 5) exposed to the outside of the electronic device. The flexible display may include a second area (e.g., the second area ② of FIG. 4 or FIG. 5). The second area may be extended from the first area, and/or may be drawn out of and/or into the housing according to the sliding of the second housing. The electronic device may include a cavity structure (e.g., the cavity structure 510 of FIG. 4 or FIG. 5) located in the second housing. The electronic device may include a wireless communication circuit (e.g., the wireless communication circuit 540 of FIG. 4 or FIG. 5) configured to transmit and/or receive signals of a selected and/or designated frequency band via the cavity structure. The cavity structure may include a first conductive portion (e.g., the first conductive portion 511 of FIG. 4 or FIG. 5) and/or a second conductive portion (e.g., the second conductive portion 512 of FIG. 4 or FIG. 5). The first conductive portion and the second conductive portion may at least partially overlap each other, when viewed from the top of a screen (e.g., the screen S of FIG. 4 or FIG. 5) of the electronic device. The first conductive portion and the second conductive portion may be electrically connected to each other. The cavity structure may include a cavity (e.g., the cavity C of FIG. 4 or FIG. 5) between the first conductive portion and the second conductive portion.

According to an embodiment, the cavity (e.g., the cavity C of FIG. 4 or FIG. 5) may include conductive boundaries (e.g., the first conductive boundary 1302, the second conductive boundary 1303, and/or the third conductive boundary 1304 of FIG. 13C) on which connection portions (e.g., the connection portions 1300 of FIG. 13A) for electrically connecting the first conductive portion and/or the second conductive portion are located between the first conductive portion (e.g., the first conductive portion 511 of FIG. 4 or FIG. 5) and the second conductive portion (e.g., the second conductive portion 512 of FIG. 4 or FIG. 5). The cavity may include a non-conductive boundary (e.g., the non-conductive boundary 1301 of FIG. 13C) on which the connection portions are not located between the first conductive portion and the second conductive portion.

According to an embodiment, the wireless communication circuit (e.g., the wireless communication circuit 540 of FIG. 4 or FIG. 5) may be electrically connected to the cavity structure (e.g., the cavity structure 510 of FIG. 4 or FIG. 5) at a location adjacent to the non-conductive boundary (e.g., the non-conductive boundary 1301 of FIG. 13C).

According to an embodiment, the second conductive portion (e.g., the second conductive portion 512 of FIG. 4 or FIG. 5) may be coupled to the first conductive portion between the first conductive portion (e.g., the first conductive portion 511 of FIG. 4 or FIG. 5) and the screen (e.g., the screen S of FIG. 4 or FIG. 5). The wireless communication circuit (e.g., the wireless communication circuit 540 of FIG. 4 or FIG. 5) may be electrically connected to the first conductive portion and/or the second conductive portion. The first conductive portion and/or the second conductive portion may be integrally formed with the second housing (e.g., the second housing 22 of FIG. 4 or FIG. 5).

While the disclosure has been shown and described with reference to various embodiments thereof, it will be understood by those skilled in the art that various changes in form and details may be made therein without departing from the spirit and scope of the disclosure as defined by the appended claims and their equivalents. Accordingly, the scope of the various embodiments of the disclosure should be interpreted to include, in addition to the embodiments disclosed herein, all alterations or modifications derived from the technical ideas of the various embodiments of the disclosure. Moreover, the embodiment or parts of the embodiments may be combined in whole or in part without departing from the scope of the disclosure.

What is claimed is:

1. An electronic device comprising:
a housing, comprising a first housing and a second housing slidable with respect to the first housing;
a flexible display supported by the housing and forming a screen of the electronic device whose size varies according to a sliding of the second housing, wherein the flexible display includes,
a first area exposed to the outside of the electronic device, and
a second area which extends from the first area, and movable out of and into the housing by the sliding of the second housing;
a cavity structure located in the second housing; and
a wireless communication circuit for at least one of transmitting and receiving signals of a designated frequency band via the cavity structure,
wherein the cavity stricture comprises:
a first conductive portion,
a second conductive portion electrically connected to the first conductive portion, the second conductive portion overlapping the first conductive portion when viewed from above the screen of the electronic device,
a cavity between the first conductive portion and the second portion,
wherein a back cover of the second housing faces the first conductive portion and is disposed on the first conductive plate, and
wherein at least a part of the second conductive portion is located between the second area of the flexible display and the first conductive plat when the second area of the flexible display is moved into the housing.

2. The electronic device of claim 1, wherein the cavity structure includes:
a conductive boundary between the first conductive portion and the second conductive portion, the conductive boundary having connection portions, configured to electrically connect the first conductive portion and the second conductive portion, disposed between the first conductive portion and the second conductive portion, and
a non-conductive boundary between the first conductive portion and the second conductive.

3. The electronic device of claim 2, wherein the wireless communication circuit is electrically connected to the cavity structure and located to be adjacent to the non-conductive boundary.

4. The electronic device of claim 3, wherein the wireless communication circuit is located adjacent to a center of the non-conductive boundary to be electrically connected to the cavity structure.

5. The electronic device of claim 3, wherein the wireless communication circuit is located adjacent to a center of the non-conductive boundary to be electrically connected to the cavity structure.

6. The electronic device of claim 2, wherein the connection portions are formed using at least one of ultrasonic bonding and welding.

7. The electronic device of claim 1, wherein the second conductive portion is coupled to the first conductive portion.

8. The electronic device of claim 1, wherein the wireless communication circuit is electrically connected to the first conductive portion.

9. The electronic device of claim 1, wherein the wireless communication circuit is electrically connected to the second conductive portion.

10. The electronic device of claim 1, wherein the first conductive portion is integrally formed with the second housing.

11. The electronic device of claim 1, wherein the second conductive portion is integrally formed with the second housing.

12. The electronic device of claim 1, wherein the first conductive portion includes a plurality of conductive portions.

13. The electronic device of claim 1, wherein the cavity of the cavity structure defines a first cavity and a second cavity.

14. The electronic device of claim 13, wherein the wireless communication circuit is configured to:
electrically connect to the cavity structure to correspond to the first cavity; and
electrically connect to the cavity structure to correspond to the second cavity.

15. An electronic device comprising:
a housing, comprising a first housing and a second housing, wherein the second housing is movable with respect to the first housing;
a flexible display supported by the housing, wherein the flexible display includes,
a first area exposed to the outside of the electronic device, and
a second area which extends from the first area, and is movable out of and into the housing by sliding the second housing relative to the first housing;
a cavity structure located in the second housing and having a first conductive portion electrically connected to a second conductive portion, wherein the first conductive portion and the second conductive portion overlap each other when viewed from above a screen of the electronic device, wherein the cavity structure defines a cavity located between the first conductive portion and the second conductive portion; and
a wireless communication circuit for at least one of transmitting and receiving signals via the cavity structure,
wherein the cavity structure includes:
a conductive boundary between the first conductive portion and the second conductive portion, the conductive boundary having connection portions, configured to electrically connect the first conductive portion and the second conductive portion, disposed between the first conductive portion and the second conductive portion, and a non-conductive boundary between the first conductive portion and the second conductive.

16. The electronic device of claim 15, wherein the wireless communication circuit is electrically connected to the cavity structure and located to be adjacent to the non-conductive boundary.

17. An electronic device comprising:

a first housing;

a second housing slidable with respect to the first housing;

a flexible display, wherein the flexible display includes, a first area exposed to the outside of the electronic device, and a second area which extends from the first area, and is movable out of and into the housing by sliding the second housing relative to the first housing;

a cavity structure defining a cavity and being located within the second housing; and a wireless communication circuit for at least one of transmitting and receiving signals of a designated frequency band via the cavity structure, wherein the cavity structure comprises:

a first conductive portion, a second conductive portion electrically connected to the first conductive portion, the second conductive portion overlapping the first conductive portion when viewed from above a screen of the electronic device, and a cavity between the first conductive portion and the second portion, wherein the second conductive portion is coupled to the first conductive portion and located between the first conductive portion and the screen of the electronic device.

* * * * *